United States Patent

Usui et al.

[11] Patent Number: 6,006,146
[45] Date of Patent: Dec. 21, 1999

[54] METHOD AND APPARATUS FOR DIAGNOSING A VEHICLE

[75] Inventors: Shigeru Usui; Hiroshi Yokoi; Kazumune Sasaki, all of Saitama, Japan

[73] Assignee: Honda Giken Kogyo Kabushiki Kaisha, Tokyo, Japan

[21] Appl. No.: 08/860,570

[22] PCT Filed: Jan. 31, 1997

[86] PCT No.: PCT/JP97/00248

§ 371 Date: Jun. 30, 1997

§ 102(e) Date: Jun. 30, 1997

[87] PCT Pub. No.: WO97/29352

PCT Pub. Date: Aug. 14, 1997

[30] Foreign Application Priority Data

Feb. 5, 1996 [JP] Japan ................................. 8-040276

[51] Int. Cl.$^6$ ................................................. G06F 7/00
[52] U.S. Cl. ........................... 701/29; 701/35; 701/66; 701/97; 340/439
[58] Field of Search ............................. 701/29, 32, 33, 701/35, 66, 97, 30; 340/439, 459, 825.15, 931

[56] References Cited

U.S. PATENT DOCUMENTS

| | | | |
|---|---|---|---|
| 4,267,569 | 5/1981 | Baumann et al. | 364/431 |
| 5,515,272 | 5/1996 | Sakai et al. | 701/29 |
| 5,565,856 | 10/1996 | Takeba et al. | 701/29 |
| 5,757,645 | 5/1998 | Schneider et al. | 701/29 |

FOREIGN PATENT DOCUMENTS

| | | |
|---|---|---|
| 61-25091 | 6/1986 | Japan . |
| 3-59372 | 9/1991 | Japan . |

*Primary Examiner*—William A. Cuchlinski, Jr.
*Assistant Examiner*—Gertrude Arthur
*Attorney, Agent, or Firm*—Armstrong, Westerman, Hattori, McLeland & Naughton

[57] ABSTRACT

There is provided vehicle diagnostic method and apparatus capable of reducing restrictions on the sequence and timing of operations to be performed by an operator for each diagnostic item.

In the vehicle diagnostic apparatus, the actual vehicle state detected by the vehicle state detection apparatus 223 is compared with the expected state selected by the selection apparatus 222. For example, while the operator runs the vehicle on purpose to execute the "Vehicle Sensor Diagnosis", if an actual state (vehicle speed VS) is detected by the vehicle state detection apparatus 223, an expected state of the vehicle speed (reference vehicle speed VSref) will be selected by the selection apparatus 222. Then both states are compared by the comparison apparatus 224. When both states are identified as exhibiting an expected relation (e.g., correspondence), the comparison apparatus 224 makes the display 27 indicate that the diagnostic item 1 is passed. Specifically, the indication of "01" is erased from the display 27.

15 Claims, 17 Drawing Sheets

FIG. 5
| CODE NAME | CODE | STANDARD DATA/UNIT |
|---|---|---|
| NUMBER OF TIMES OF IDLING DIAGNOSES | CID-ref | x1 (TIMES) |
| REFERENCE VEHICLE SPEED | VSref | x2 (Km/h) |
| TOLERANCE | NID-TRC | x3 (RPM) |
| REFERENCE IDLING MEASUREMENT TIME | MID-ref | x4 (sec) |
| STANDBY MODE STARTING CONDITION | Tss-ref | x5 (min) |
73
FIG. 6
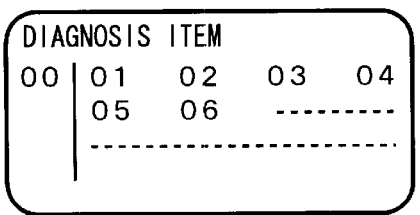
(a)
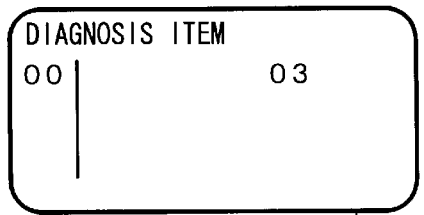
(b)
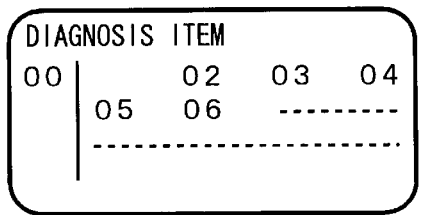
(d)
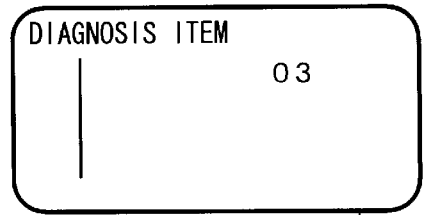
(e)
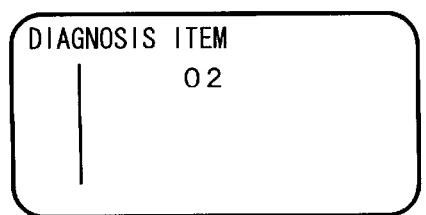
(c)
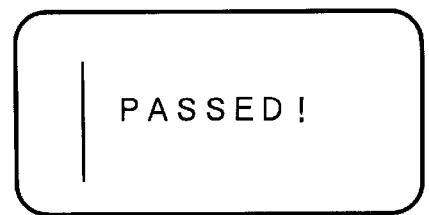
(f)

F I G. 7
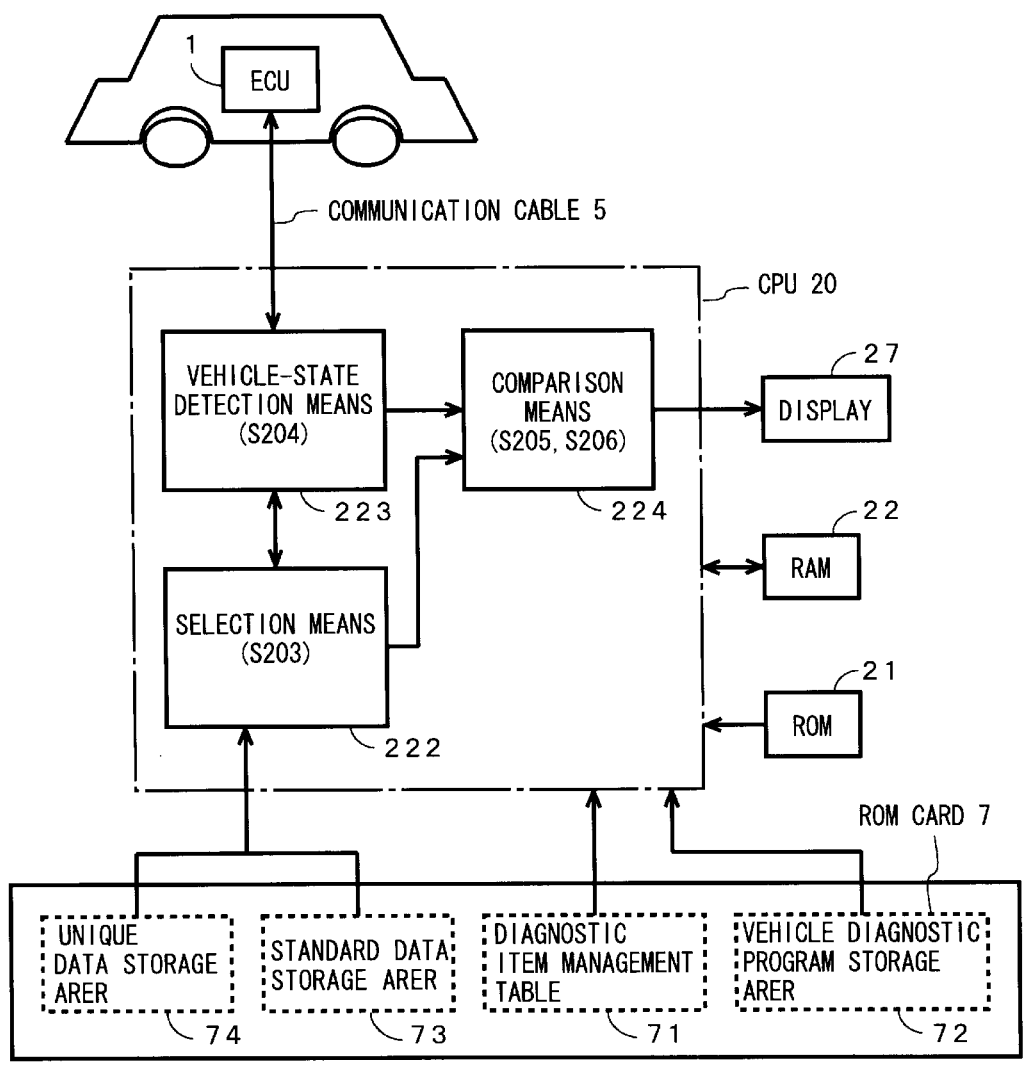

F I G. 1 7
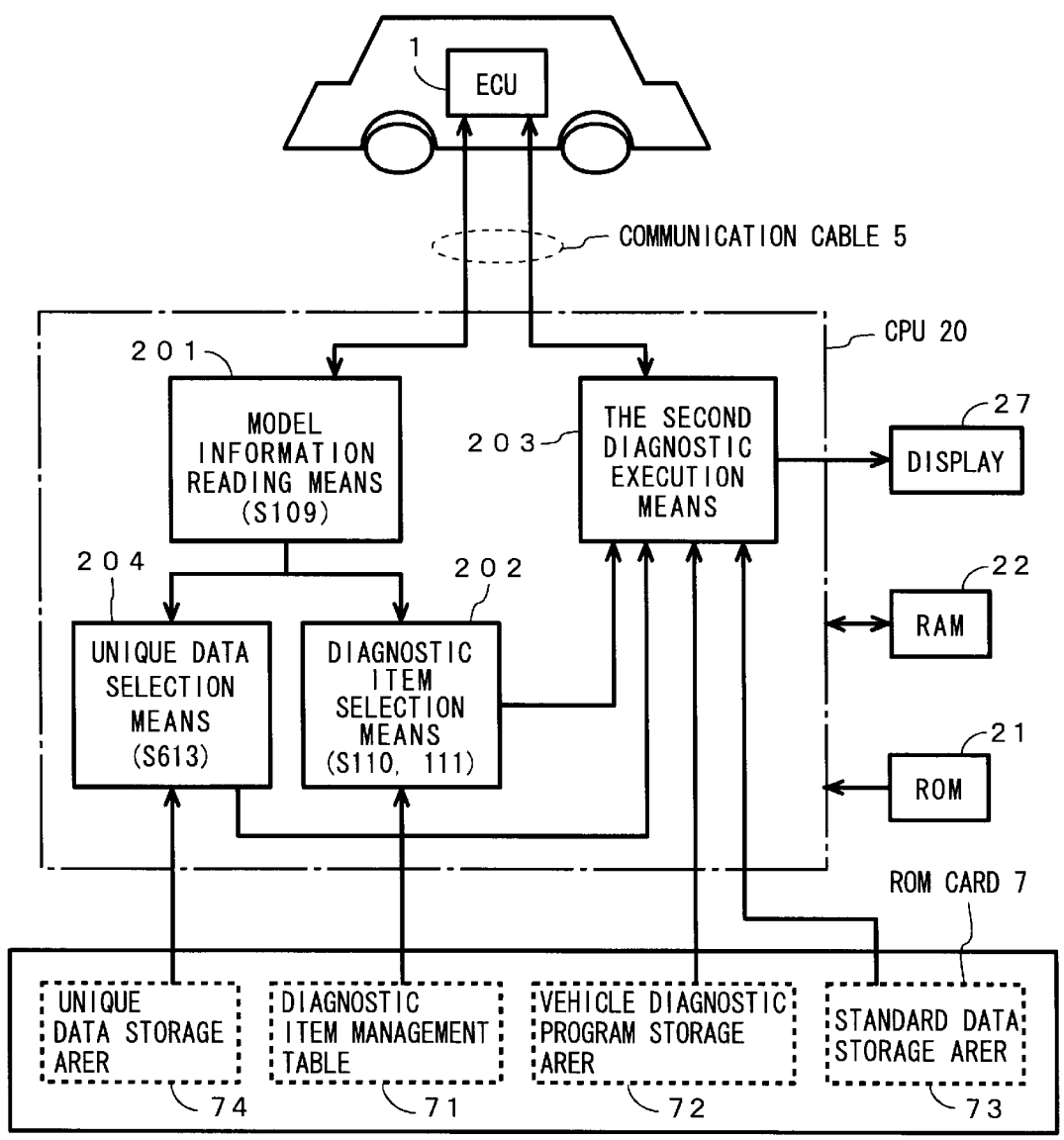

METHOD AND APPARATUS FOR DIAGNOSING A VEHICLE

TECHNICAL FIELD

This invention relates to vehicle diagnostic method and apparatus, and in particular, to the vehicle diagnostic method and apparatus for communicating with an electronic control unit mounted on a vehicle to diagnose the vehicle based on the communication results. More specifically, it relates to the vehicle diagnostic method and apparatus capable of reducing restrictions on the sequence and timing of operations to be performed by an operator for each diagnostic item.

BACKGROUND ART

To improve engine control functions, an electronic control unit (ECU) with a microcomputer has been used in recent years for executing control programs, such as control of ignition timing in an engine, control of valve opening and closing timing, and/or control of fuel injection in an electronic fuel injector (EFI) for an automobile (hereinafter, referred to as a "vehicle"). The ECU is connected to sensors, such as a temperature sensor for detecting a temperature of engine cooling water, an engine-speed sensor for detecting an engine speed, a vehicle-speed sensor for detecting a vehicle speed, and an O2 sensor for detecting an oxygen concentration in exhaust gas. The ECU is also connected to switches such as a brake switch for detecting that a driver has stepped on a brake pedal. The ECU thus executes various kinds of controls based on detection signals output from the sensors and others.

On the production line where vehicles with such an ECU are manufactured, in the final test process after assembled, it should be diagnosed whether or not each of sensor and the like, and the ECU itself functions normally. For example, Japanese patent publication No. Hei 3-59372 proposes a diagnostic method in which a diagnostic apparatus with a microcomputer executes a vehicle diagnostic program to diagnose a desired diagnostic item at scheduled timing.

In a failure diagnosis related to a plurality of diagnostic items, for example, as disclosed in Japanese patent publication No. Sho 61-25091, the plurality of diagnostic items are diagnosed in predetermined order and the results of pass/failure or displayed judgment in respective diagnostic items are output one by one.

A typical checking (diagnostic) apparatus with a microcomputer is generally designed to make its display part show a menu screen when the operator turns on a power switch of the checking apparatus after connected to a machinery to be checked. On the menu screen, a list of many available functions is displayed, such as "Self-Diagnostic Function", "Memory Check Function" and "Mode Select Function", including a desired checking function. Then the operator selects a desired checking function through a key operation to start a test program for executing the selected checking function.

Some of such vehicle diagnostic items require particular preconditions. For example, an "Ne Diagnosis" to determine whether or not an engine speed Ne at idling time is in a given range or not must be executed under the condition that the engine has been warmed up adequately. Some other diagnostic items require no precondition and are allowed to complete the diagnosis for an instant, such as a "Brake Switch Diagnosis" to diagnose an opening and closing function of a brake switch. It should be noted that the "Ne Diagnosis" is automatically executed according to the program, and the operator has nothing to do during execution of this program but keep the engine idling.

When a vehicle diagnostic program is started, the result of the "Switch Diagnosis" can be obtained in a very short time after starting the diagnosis, but the "Ne Diagnosis" cannot be even started until the preconditions, such as to warm up the engine adequately, are satisfied. Therefore, even if the "Ne diagnosis" is not judged to be passed, it will require much operator's labor to determine whether the judgment is caused by a fault of the idling speed Ne or the diagnosis itself that has not been executed yet because the engine has not been warmed up adequately.

When such a plurality of diagnostic items are required, the sequence of items to be diagnosed is predetermined in a conventional vehicle diagnostic program. It is therefore impossible to diagnose a subsequent item before the previous item is diagnosed as being passed or failed. If the "Brake Switch Diagnosis" is prearranged to be executed after the "Ne Diagnosis", the operator can not start executing the "Brake Switch Diagnosis" until the "Ne Diagnosis" has been completed after warming up the engine, and is kept waiting wastefully during the execution of the "Ne Diagnosis". This causes long compulsory working-hours of the operator.

When the sequence of items to be diagnosed is predetermined, as discussed above, the operator is restricted by the sequence and timing of operations to be performed for each diagnostic item. This also raises a problem that the work efficiency is reduced.

The combination of the vehicle diagnostic items to be executed depends on the specification of each individual vehicle, including the type of the vehicle construction such as the transmission type of manual or automatic, and its designation. Such conditions of each individual vehicle have been registered as model information in the ECU of the vehicle. In conventional vehicle diagnostic methods, the type of vehicle construction and designation are recognized and items to be diagnosed are selected based on the model information so that only the diagnoses related to the selected items is executed. If there is comparison data to be used only in a specific model for quality judgment, the operator must check the comparison data with corresponding model information for each individual vehicle by referring to a manual, and this causes a complicated procedure.

The sequence of diagnoses to be executed in the final test process after assembled requires the diagnostic apparatus to be turned on for quite a long time, and when an internal battery is used to provide power for the diagnostic apparatus, the operator must change the battery frequently. It is therefore desirable to feed power from a battery on the vehicle side to the diagnostic apparatus through a communication cable.

In this case, since the vehicle is a commodity, if power feeding to the diagnostic apparatus is dependent on the battery on the vehicle side, it may be good practice to turn off the power switch of the diagnostic apparatus when the operator takes a rest or has a lunch so that the power dissipation is made as low as possible. But actually the diagnostic apparatus must be kept on during a recess since the diagnostic results obtained before then are lost each time the power switch of the diagnostic apparatus is turned off. Further, when the operator stops the diagnostic process for taking a rest, an unchanged screen remains on the display during the recess, so that the display screen may be burned out.

To solve such problems, there has been proposed an additional function by which the diagnostic process goes to a standby mode to turn off the display screen, for example, when no key operation is done for a given time, on purpose to reduce the power dissipation and protect the display screen. In conventional diagnostic apparatuses, however, the operator must operate a key or keys for returning from the standby mode to the diagnostic mode, and this makes the procedure complicated.

Still another problem arises, when the power feeding to the diagnostic apparatus is dependent on the battery on the vehicle side, that the power-on operation must be done each time the diagnostic apparatus is changed for another vehicle to be diagnosed. Further, since the conventional checking (diagnostic) apparatuses are designed to display a first menu screen at all times after power-on, the menu selection must be made each time the diagnostic apparatus is changed, and this makes the operation complicated. It is possible to change the program such that the diagnostic process is started at the same time when the diagnostic apparatus is turned on, but this sacrifices capability in selecting other functions than diagnoses.

DISCLOSURE INVENTION

An object of the present invention is to provide vehicle diagnostic method and apparatus capable of executing a vehicle diagnosis without limitation on the sequence and timing of operations to be performed by an operator for each diagnostic item.

Another object of the present invention is to provide a vehicle diagnostic method and an apparatus capable of automatically selecting diagnostic items and reading comparison data in accordance with model information, such that the operator is released from selecting diagnostic items for each specific model information.

Still another object of the present invention is to provide a vehicle diagnostic method and an apparatus capable of automatically switching from a diagnostic mode to a standby mode, and vice versa.

Yet another object of the present invention is to provide a vehicle diagnostic method and an apparatus capable of making operation of the diagnostic apparatus easier and starting diagnoses quickly.

Yet another object of the present invention is to provide a vehicle diagnostic method and an apparatus, in which when a diagnosis requiring preconditions is not judged to be passed, determination is made easier as to whether the judgment is caused by a fault of the diagnostic item or the diagnosis itself that has not been executed yet due to unsatisfied preconditions.

The present invention is characterized in the following points:

(1) A vehicle diagnostic apparatus, in which when each portion of a vehicle to be diagnosed has been operated to be an expected state, determination is made as to whether each diagnostic item is passed or failed based on whether or not an actual state of each portion of the vehicle is in the expected state, comprises storage means for storing the expected state to be indicated by each portion of the vehicle; vehicle-state detection means for detecting an actual state of each portion of the vehicle in a circular made; comparison means for comparing the actual state circularly detected with the expected state; and display means for indicating on a display that the diagnostic item corresponding to the actual state detected is judged to be passed when both states exhibit an expected relation.

According to such a structure, each diagnosis related to each diagnostic item is circularly executed, so that the operator can be released from the limits on the sequence and timing of operations to be performed for each diagnostic item.

(2) There is provided a vehicle diagnostic apparatus comprising means for reading out a vehicle model information (ECU code) unique to each individual ECU; means for selecting a "combination of diagnostic items", in accordance with the model information, from all the diagnostic items stored in a memory; means for selecting unique data, in accordance with the model information, from all the data stored in the memory; and means for executing a vehicle diagnosis unique to the read model information based on the combination of diagnostic items and the unique data selected.

According to such a structure, pertinent diagnostic items and unique data are automatically determined in accordance with the model information, so that the efficiency of the diagnostic work can be improved.

(3) There is provided a vehicle diagnostic apparatus comprising means for communicating with the ECU to detect a change in engine speed Ne; means for starting a standby mode when no change in the engine speed Ne has been detected over a given period of time in a diagnostic mode; means for starting the diagnostic mode when a change in the engine speed Ne is detected in the standby mode; means for executing each diagnosis while communicating with the ECU; and display means, which is on in the diagnostic mode, but turns to be off when the standby mode is started, then is restored to being on when the diagnostic mode is restarted.

According to such a structure, the diagnostic mode is automatically shifted to the standby mode when no change in the engine speed has not been detected over the given period of time, while the standby mode is automatically restored to the diagnostic mode when a change in the engine speed is detected. Therefore, the operator has only to stop the engine when suspending the diagnostic process during a recess, or to start the engine when restarting the diagnostic process after the recess, without any other additional operation. This makes it possible to simplify the procedure at switching from the diagnostic mode to the standby mode, and vice versa.

(4) There is provided a vehicle diagnostic apparatus comprising means for detecting that the operator has turned on a power-supply switch; means for detecting the presence or absence of connection of a communication cable to the ECU; main control means for starting main control when either the power-on operation by the operator or the connection of the communication cable to the ECU is detected; means for making a display part show a menu screen when the main control means is started by the power-on operation; and means for starting a vehicle diagnostic process immediately without showing the menu screen when the main control means is started by the connection of the communication cable to the ECU.

According to such a structure, when the vehicle diagnostic apparatus is started by connecting it to the ECU, the vehicle diagnostic process is started immediately without showing the menu screen, so that the operability of the vehicle diagnostic apparatus can be improved and the vehicle diagnostic process can be started more quickly. The menu screen can be displayed by the power-on operation, and this allows the operator to easily select any other function than the diagnoses.

(5) There is provided a vehicle diagnostic apparatus comprising means for automatically diagnosing each diagnostic item according to a predetermined procedure: means for discriminating between an item or items that have not been judged to be passed yet and an item or items that have already been judged to be passed, and making a display means indicate such discrimination result; means for making a judgment on at least one diagnostic item as to whether or not preconditions required for said at least one diagnostic item have been satisfied; and means for making the display means indicate the judgment results.

According to such a structure, the item or items that have not been judged to be passed yet and the item or items that have already been judged to be passed are discriminated with each other on the display, so that the operator can easily recognize the item or items that have not been judged to be passed yet. With at least one specific item requiring preconditions, when the preconditions required for the diagnosis have not been satisfied yet, such a situation is indicated on the display. Accordingly, even if a specific item is not judged to be passed, the operator can easily recognize that the diagnosis related to the specific item has not been executed yet because of unsatisfied preconditions on the basis of the indication on the display.

BRIEF DESCRIPTION OF DRAWINGS

FIG. 5 is a diagram showing the contents of a standard data storage area 73;

FIG. 6 is a diagram showing exemplary results of diagnosis indicated on a display 27;

FIG. 7 is a functional block diagram of the main operation showing a first embodiment of a vehicle diagnostic apparatus according to the present invention;

FIG. 17 is a functional block diagram showing a processing according to the present invention, by which diagnostic items are selected in accordance with an ECU code.

BEST MODE FOR CARRYING OUT THE INVENTION

Figure 1:
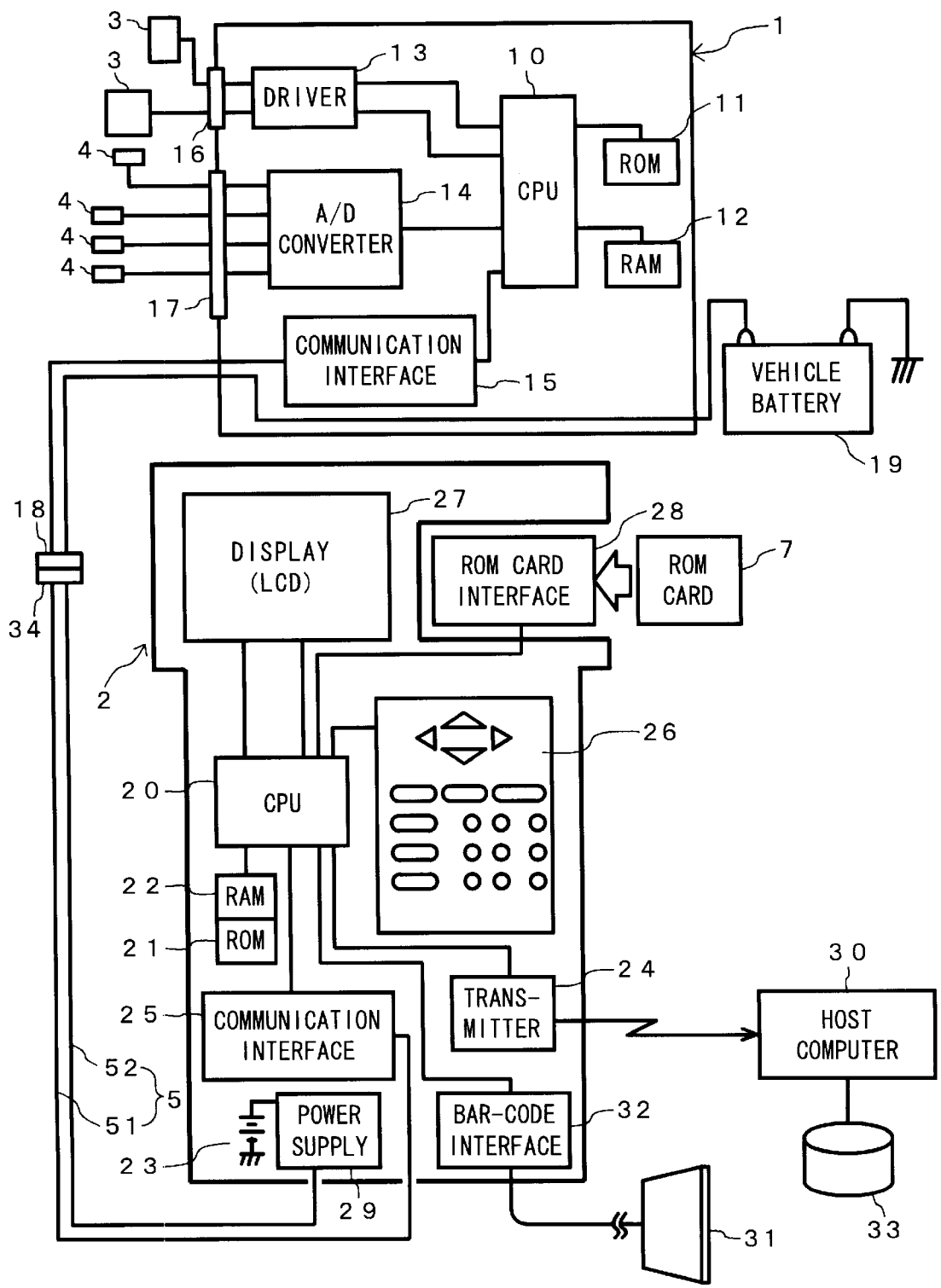
FIG. 1 is a block diagram showing a configuration of an ECU 1 mounted on a vehicle to be diagnosed and a vehicle diagnostic apparatus 2 according to the present invention.
Figure 8:
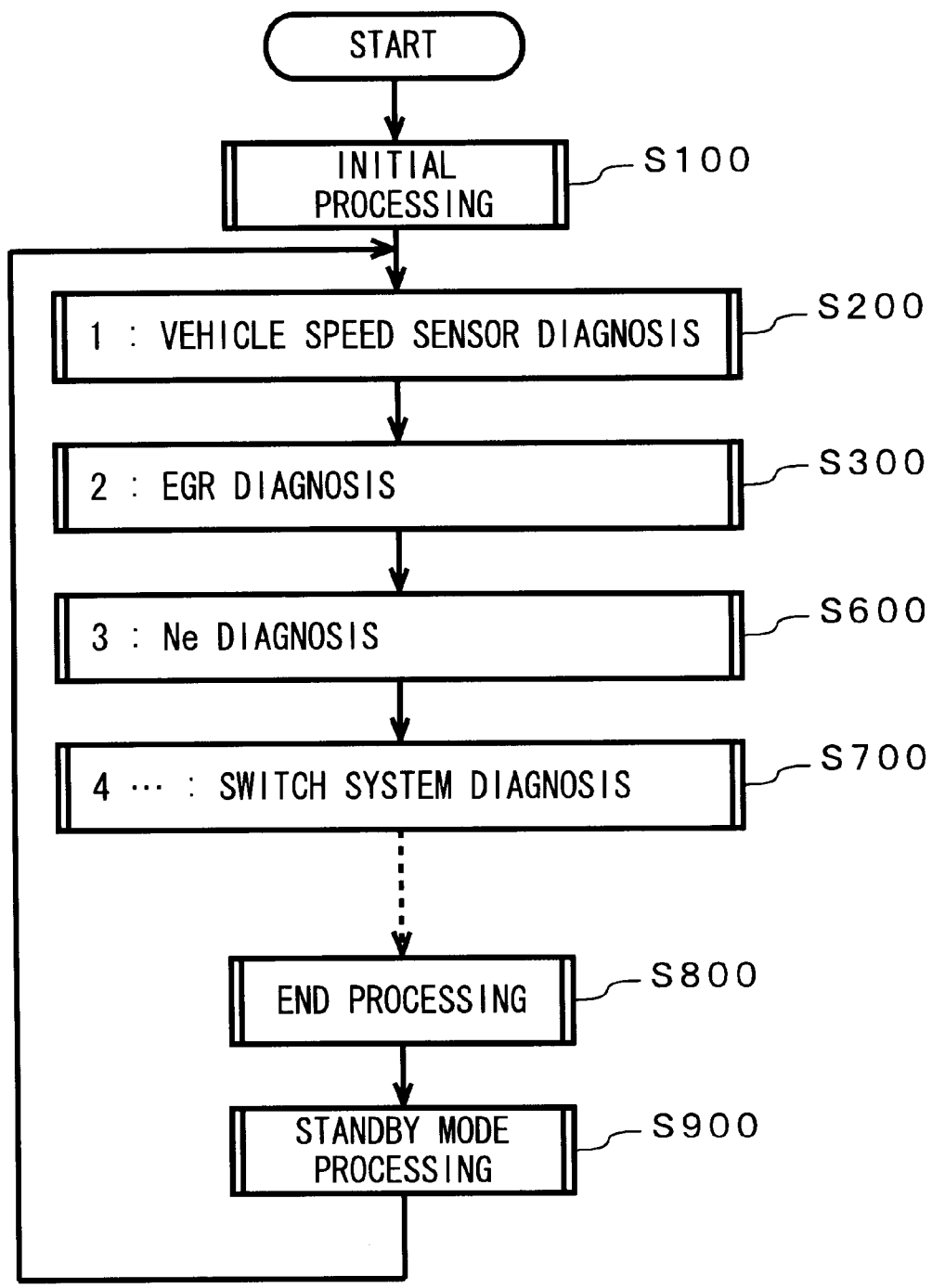
FIG. 8 is a flowchart showing a main flow of a vehicle diagnostic program according to the present invention.

Referring now to the drawings, the present invention will be described below in detail. FIG. 1 is a block diagram of a first embodiment of the present invention, which shows a configuration of an ECU 1 mounted on a vehicle to be diagnosed and a vehicle diagnostic apparatus 2 connected to the ECU 1 to be used. FIGS. 2 to 5 are schematic diagrams showing the contents of a ROM card 7 to be inserted into the vehicle diagnostic apparatus 2 of FIG. 1. FIG. 6 shows exemplary results of diagnosis indicated on a display 27. FIG. 7 is a functional block diagram of a vehicle diagnostic apparatus to which the present invention is applied. FIG. 8 is a flowchart showing a main flow of a vehicle diagnostic program according to the present invention. FIGS. 9 to 16 are flowcharts specifically showing each operation of diagnostic processings.

In FIG. 1, the ECU 1 is constituted of a CPU 10, a ROM 11, a RAM 12, a driver 13, an A/D converter 14, and a communication interface 15. The ECU 1 is connected to peripherals devices through connectors 16 and 17. For example, actuators 3 are connected with the connector 16, while various types of sensors and switches 4 are connected with the connector 17. The ECU 1 is also connected by a connector 18 to a communication cable 5 of the vehicle diagnostic apparatus 2 through a connector 34.

Signals from each sensor 4 or the like are input to the ECU 1. In the ECU 1, the signals are converted by the AND converter 14 into digital signals and read into the CPU 10. The signals read in the CPU 10 are processed with control data stored in the ROM 11 and the RAM 12 according to a control program stored in the ROM 11. The CPU 10 provides a command signal to the driver 13 in accordance with the processing result. The driver 13 provides power for each actuator 3 in response to the command signal input. The ROM 11 stores not only the program but also identification codes or ECU codes assigned to each individual ECU 1.

The vehicle diagnostic apparatus 2 according to the present invention is constituted of a CPU 20, a ROM 21, a RAM 22, a transmitter 24, a communication interface 25, and a power source 29. By the power supply 29, either a vehicle battery 19 mounted on the vehicle to be diagnosed or an internal battery 23 is selected as a power supply of the vehicle diagnostic apparatus 2. The vehicle diagnostic apparatus 2 is also provided with a keyboard 26 for input of operator's instructions, a display 27 for displaying processing results of the CPU 20, a bar-code reader 31 for reading identification bar-codes, and a bar-code interface 32. In the present embodiment, a back-lighted liquid crystal display panel (LCD) is used as the display 27. Further, the keyboard 26 includes typical ten keys, cursor navigation keys, and some function keys.

The communication cable 5 is constituted of a signal line 51 and a power-supply line 52. The communication interface 15 of the ECU 1 and the communication interface 25 of the vehicle diagnostic apparatus 2 are connected through the signal line 51 so that two-way digital communications can be established between the CPU 10 and the CPU 20. When connecting the communication cable 5 to the ECU 1, the power supply 29 provides the vehicle diagnostic apparatus 2 with power supplied by the vehicle battery 19 through the power-supply line 52, and simultaneously charges the internal battery 23.

As described later in detail, the vehicle diagnostic apparatus 2 is started or activated by the operator turning on a power supply key switch (not shown) on the keyboard 26, or connecting a connector 34 of the communication cable 5 to the connector 18 of the ECU 1 without operation of the power supply key switch. The vehicle diagnostic apparatus 2 after activated acts in different ways depending on which starting operation is done by the operator.

The ROM 21 stores a basic program for controlling the vehicle diagnostic apparatus 2, and associated control data. On the other hand, the ROM card 7 stores individual information to which a new information may be added and or which may be changed when manufacture a new type of car or the like, such as unique data used for each diagnosis routine and the vehicle diagnostic program. Data of the ROM card 7 are read into the CPU 20 through a ROM card interface 28.

Signals read from the ECU 1 are processed based on the basic data stored in the ROM 21 and the RAM 22, and the control data and the vehicle diagnostic program stored in the ROM card 7. The processing results, that is, the diagnostic results are temporarily stored into the RAM 22. The diagnostic results are output to the display 27 whenever the diagnosis of each vehicle is finished. The operator then causes the vehicle diagnostic apparatus 2 to transmit the data on the diagnostic results of several vehicles from the transmitter 24 to a host machine, such as a host computer 30, so as to be centrally controlled by the host computer 30 and stored in a mass storage device 33. Otherwise, the vehicle diagnostic apparatus 2 may be connected to an unillustrated personal computer that provides necessary information, such as an updated (version-up) failure diagnostic program, to the vehicle diagnostic apparatus 2.

Figures 2, 3, 4:
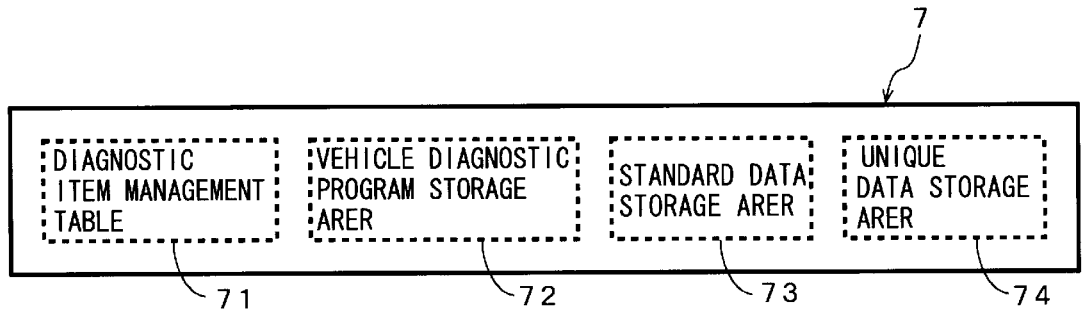
FIG. 2 is a schematic diagram showing the contents of a ROM card 7.
FIG. 3 is a diagram showing the contents of a diagnostic item management table 71.
FIG. 4 is a diagram showing the contents of a unique data storage area 74.

As shown in FIG. 2, the ROM card 7 contains a diagnostic item management table 71 for use to select diagnostic items unique to engine type according to the ECU code, a vehicle diagnostic program storage area 72 for storing a vehicle diagnostic program related to a plurality of diagnostic items, a standard data storage area 73 for storing standard data commonly used for a plurality types of the vehicles irrespective of the type of the ECU mounted thereon, and a unique data storage area 74 for storing unique data the contents of which may vary according to each individual ECU.

FIG. 3 shows exemplary contents of the diagnostic item management table 71. The vehicle diagnostic apparatus 2 according to the present invention is able to diagnose various diagnostic items. Although the vehicle diagnostic apparatus 2 includes all algorithms for respective diagnostic items, since all of the items are not always diagnosed for every vehicles, that is, since the items to be diagnosed for each vehicle are usually different, each item in the management table 71 has an entry "1 (selected)" or "0 (not-selected)" for each ECU code. As an example, for a vehicle having an ECU code "○△×□" in FIG. 3, diagnostic items 1, 2, 5, 6, . . . are selectively diagnosed and the other items are not diagnosed.

FIG. 4 shows the contents of the unique data storage area 74. In the present embodiment, the unique data storage area stores unique data the contents of which may vary according to each individual ECU (ECU code), such as an individual reference idling speed NID-ref registered in accordance with each individual ECU code. As described later in detail, the individual idling speed NID-ref denotes a reference engine speed or RPM when the engine is idling, which varies according to each individual ECU code. Therefore, the individual idling speed NID-ref relative to the individual ECU code of the vehicle to be diagnosed is compared with a detected engine speed Ne to diagnose whether the engine speed in the idling state is normal or abnormal.

In the present embodiment, different diagnostic routines, that is, a combination of diagnostic items, and associated unique data are automatically determined according to each individual ECU code, so that the operator is released from selecting operation of the diagnostic items and setting operation of the unique data. This reduces the operator load; besides, it increases the accuracy of each diagnosis because an error in selection of the diagnostic items and unique data is eliminated.

FIG. 5 shows the contents of the standard data storage area 73. The standard data storage area 73 contains standard data x1 to x5 commonly used in respective diagnostic processings of the diagnostic program irrespective of the ECU code.

Next, operation of the present embodiment will be described with reference to flowcharts. FIG. 8 is a flowchart showing a main flow of a vehicle diagnostic program executed by the vehicle diagnostic apparatus according to the present invention. Although the vehicle diagnostic apparatus according to the present invention can be used for vehicle diagnosis under any environments, such as on the production line or at an auto repair shop, the present embodiment takes a case in which the "Inspection Process" is executed on the production line at a factory, by way of example to describe its operation.

In FIG. 8, step S100 executes an "Initial Processing". The "Initial Processing" is one of characteristic functions of the present invention and will be described in detail later referring to a functional block diagram of FIG. 19 and a flowchart of FIG. 9. Step S200 executes a "Vehicle Speed Sensor Diagnosis" registered as a diagnostic item 1. Step S300 executes an "EGR (Exhaust Gas Recirculator) Diagnosis" registered as a diagnostic item 2. Step S600 executes an "Ne Diagnosis" registered as a diagnostic item 3. Step S700 executes a "Switch System Diagnosis", in which each of switches registered as diagnostic items 4, 5, . . . are diagnosed. Step S800 executes an "End Processing" and step S900 executes a "Standby Mode Processing". The "Standby Mode Processing" is another of characteristic functions of the present invention and will be described in detail later referring to a functional block diagram of FIG. 18 and a flowchart of FIG. 16. After the step S800, the program returns to the step S200 and the sequence of every diagnosis routines is repeated until all the diagnostic items are concluded.

The vehicle diagnostic apparatus according to the present invention is thus designed to repeat a plurality of diagnoses related to various diagnostic items automatically during given execution cycles. Hereinbelow, each diagnostic method and processing method of each items will be described in detail.

Figure 9:
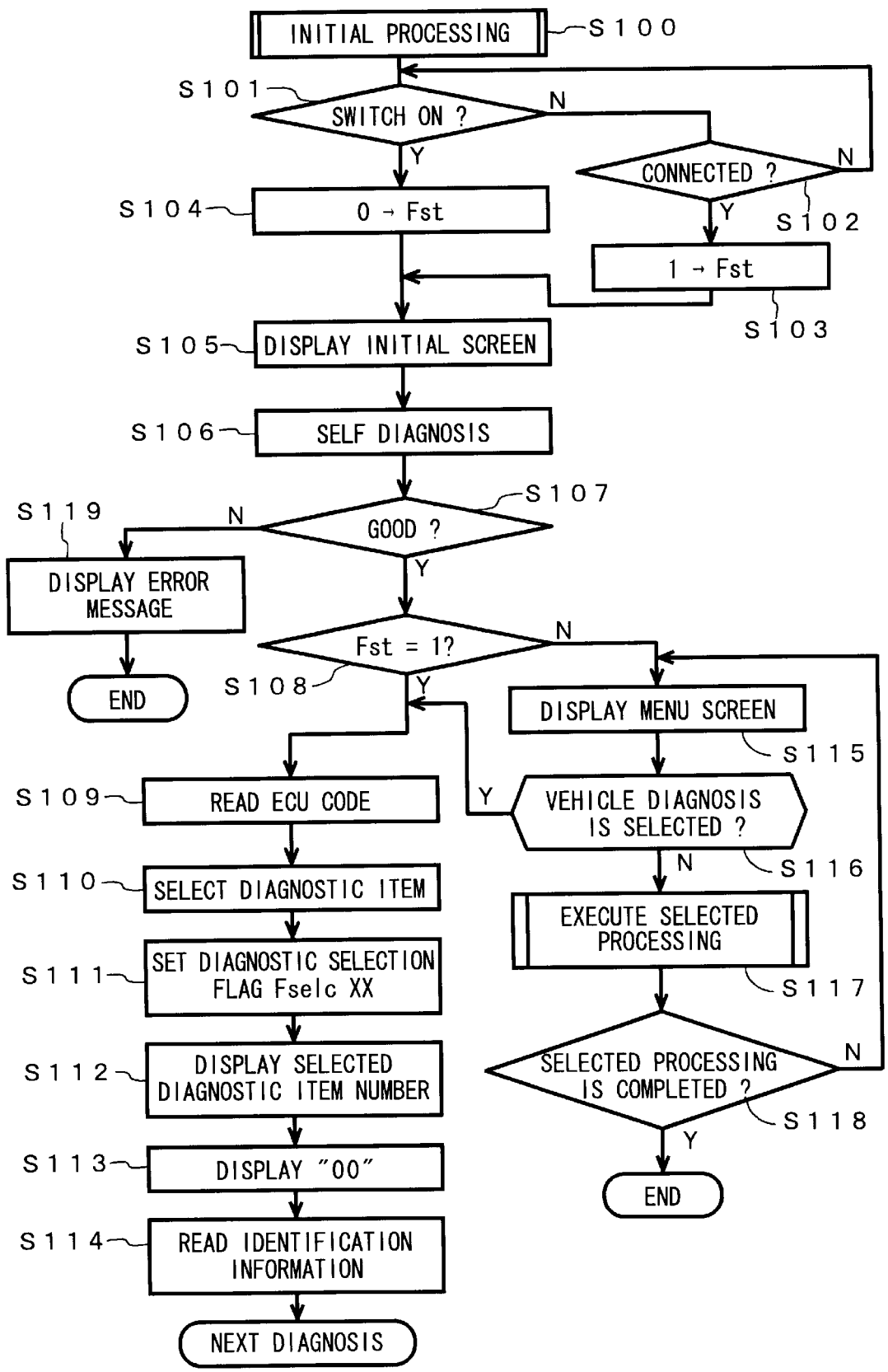
FIG. 9 is a flowchart showing an operation of an initial processing.
Figure 19:
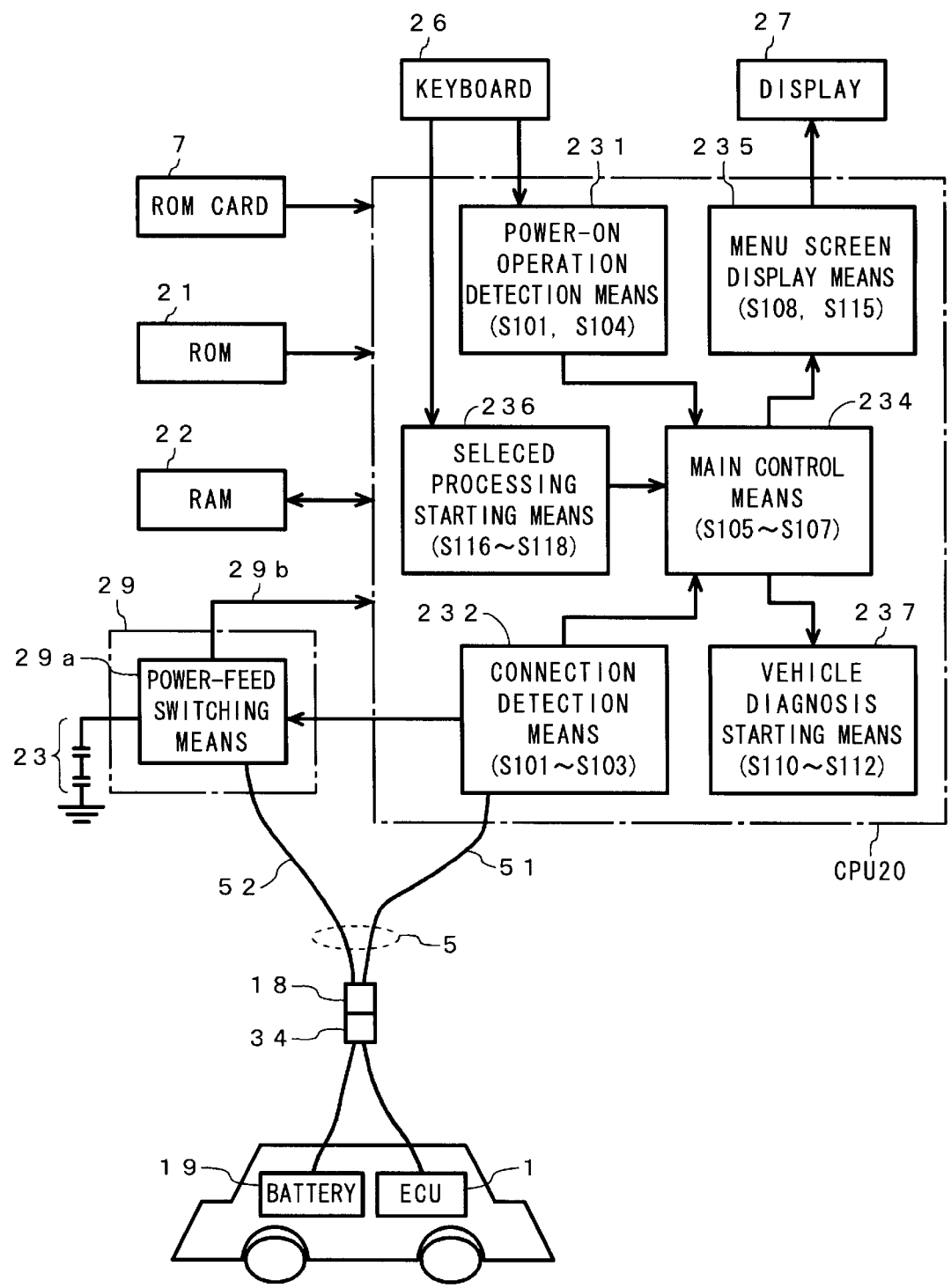
FIG. 19 is a functional block diagram showing an "Initial Processing" according to the present invention.

FIG. 9 is a flowchart showing an operation of the "Initial Processing" in step S100; FIG. 19 is a functional block diagram of a vehicle diagnostic apparatus for executing the "Initial Processing". Description will be made first to the structure of the vehicle diagnostic apparatus referring to the functional block diagram of FIG. 19, then to a concrete example of the operation referring to the flowchart of FIG. 9. Step numbers in respective blocks of FIG. 19 corresponds to step numbers in respective steps in the flowchart, indicating that the respective blocks execute processings in the corresponding steps.

As previously described, the vehicle diagnostic apparatus 2 according to the present invention is started or activated by the operator either turning on a power-supply switch on the keyboard 26, or connecting the communication cable 5 to the ECU 1. Therefore, the initial processing first determines which procedure is used for the power input.

In FIG. 19, power-on operation detection means 231 is one of functions of the CPU 20 to be executed in accordance with a program and control data stored in the ROM card 7, the ROM 21 and/or the RAM 22, as described later, for example, with respect to steps S101 and S104 of FIG. 9, which detects operator's power-on operation. Connection detection means 232 is another of functions of the CPU 20 for executing a sequence of processings in steps S101, S102 and S103, which detects whether or not the connection of the connection cable 5 to the ECU 1 is established. Main control means 234 is still another of functions of the CPU 20 for executing a sequence of processings, such as in steps S105 to S107, which starts main control either when the power-on operation detection means 231 detects the power-on operation, or when the connection detection means 232 detects the connection of the communication cable 5 to the ECU 1.

Menu screen display means 235 executes a processing in step S108 or S115, that is, it makes the display part 27 show a menu screen when the main control means 234 has been started or activated by the power-on operation. Selected processing starting means 236 executes a sequence of steps S116 to S118, that is, it executes a processing selected by the operator from processings on the menu screen. Vehicle diagnosis starting means 237 executes steps S108, and S110–S112, that is, it just starts the vehicle diagnostic processing without displaying the menu screen when the main control means 234 is started by connecting the communication cable 5 to the ECU 1. A power-feeding line 29b provides source power for respective means.

A power-feed switching means 29a is one of functions of the power source 29, which switches the power-feeding path of the power-feeding line 29b from the internal battery 23 to the communication cable 5 when the vehicle diagnostic apparatus 2 is connected to the ECU 1 and started, such that the battery 19 mounted on the vehicle to be diagnosed feeds power to the diagnostic apparatus 2 through the communication cable 5.

Step S101 in FIG. 9 determines whether or not the power is supplied to the vehicle diagnostic apparatus 2 by turning on the power-supply switch. If the power-supply switch has been turned on, a flag Fst representing a power-on procedure is set to "1" in step S104. In this case, the internal battery 23 provides power for the vehicle diagnostic apparatus 2. If the power input by turning on the switch is not detected, step S102 determines whether or not the communication cable 5 has been connected to the vehicle (ECU 1). If the connection is detected, the flag Fst is set to "1" in step S103. In this case, the vehicle battery 19 provides power for the vehicle diagnostic apparatus 2.

When detecting either the power input by the switch or the power input by the cable connection, step S105 makes the display 27 show an initial image on its screen. Then, step S106 executes a self diagnosis for checking the abnormality or failure of the vehicle diagnostic apparatus 2 itself. When the result of the self-diagnosis is judged in step 107 to be passed, the program advances to step S108. If judged to be bad, step S119 makes the display 27 indicate an error message.

The step S108 checks the flag Fst to determine whether the subsequent processing to be executed should be selected by the operator from the menu image, or predetermined, specific processing should automatically be executed. In the case where the flag Fst is "1", i.e., the power has been supplied by the cable connection, the "Vehicle Diagnosis" as predetermined particular process is started immediately according to the predetermined program without showing the menu screen on the display 27. The program then advances to step S109, in which the ECU code registered in the ECU 1 is read. Step S110 retrieves the diagnostic item management table 71, previously discussed by referring to FIG. 3, based on the ECU code thus read out, to select diagnostic items to be executed. Step S111 sets "1 (select)" as diagnostic selection flags Fselc XX (where "XX" is any one of diagnostic item numbers) for each selected diagnostic items, while for "0 (non-select)" for each non-selected diagnostic items.

Step S112 makes the display 27 show a list of the diagnostic item numbers representing the selected diagnostic items. FIG. 6(*a*) shows an exemplary image displayed screen on the display 27 when all the diagnostic items have been selected. In other words, FIG. 6(*a*) shows all the diagnostic item numbers "01", "02", "03", . . . listed up on the display 27. An indication (left side) of "00" is displayed on the display in the next step S113, as described later in detail, and erased when diagnosis starting conditions of the diagnostic item 3 of "Ne Diagnosis" are satisfied and the diagnostic program therefor has been fully executed.

Such an indication is not limited by the number "00", but any alpha numerical better such as "X" or any other symbol may be used instead of the number "00" as long as it can easily be distinguished from the other diagnostic item numbers.

In step S114, an identification bar code representing an individual and unique information of each vehicle is read by the bar-code reader 31 and temporarily stored in the RAM 22. The identification bar code is previously printed on a diagnostic record that is provided for each individual vehicle. The bar code may be printed on a label or seal which is to be attached in place to the body of each vehicle instead of printing bar-code on the diagnostic record.

When the flag Fst is set to "0" in the step S108, i.e., when the step S108 determines that the operator has turned on the switch to provide power for the vehicle diagnostic apparatus 2, step S115 makes the display 27 show a menu that requests the operator to select the processing contents. Step S116 identifies the processing contents selected by the operator from the menu. When a "Vehicle Diagnosis" command is selected in step S116, the program advances to the step S109 and the diagnostic processing is started in the same manner as the case the flag Fst is set to "1". When a processing command other than the "Vehicle Diagnosis" command is selected in step S116, step S117 executes the selected other processing. Step S118 determines whether or not an "End" command is selected in the step S116. If the "End" command has been selected, the program executed is ended.

As previously described, the vehicle diagnostic apparatus 2 according to the present invention is designed to vary the operation after power input depending on which power-on procedure is used, the operation of the power switch or the cable connection. When the source power is supplied by the cable connection, the diagnostic processing is started immediately without showing the menu. This allows the operator to start the vehicle diagnostic program automatically in the inspection process, where vehicles to be diagnosed are carried on the production line one after another, by only connecting the cable 5 of the vehicle diagnostic apparatus 2 to each vehicle to be diagnosed, thus simplifying the diagnostic work. On the other hand, when the source power is supplied to the vehicle diagnostic apparatus 2 by the operator turning on the switch, the menu is displayed on the screen to facilitate the selection of any other processing.

Figure 10:
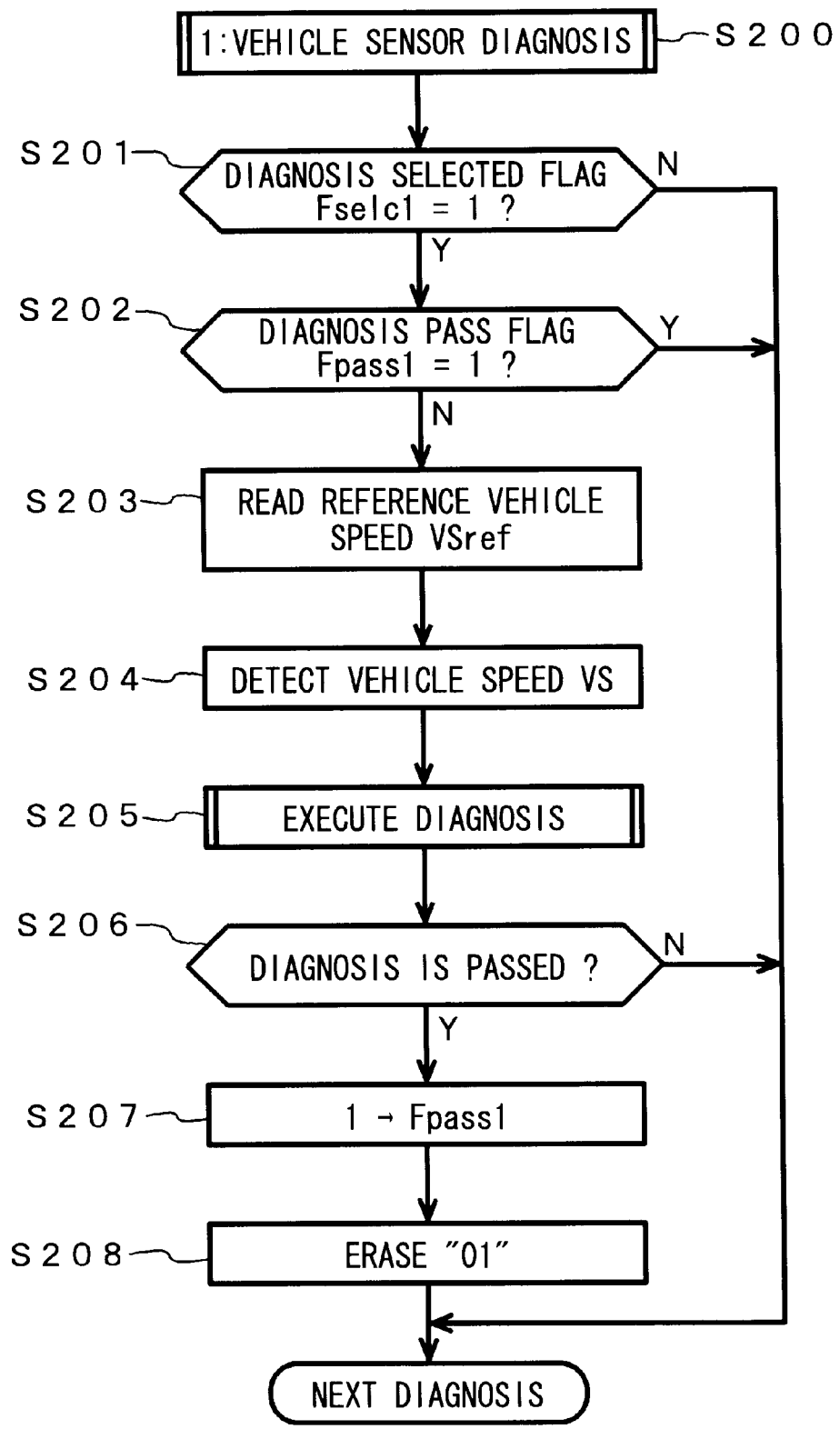
FIG. 10 is a flowchart showing an operation of a vehicle-speed sensor diagnosis.

FIG. 10 is a flowchart showing a method of the diagnostic item 1 "Vehicle Speed Sensor Diagnosis" to be executed by the step S200 of FIG. 8. The "Vehicle Speed Sensor Diagnosis" routine is to diagnose whether or not the sensor for detecting a vehicle speed VS is functioning normally, in which the vehicle speed VS detected by the vehicle speed sensor is compared with a reference value (reference vehicle speed VSref) to diagnose the vehicle speed sensor in a proper known manner in accordance with the comparison result.

Step S201 first determines whether or not the "Vehicle Speed Sensor Diagnosis" routine has been selected based on the value of a diagnostic selection flag Fselc 1 related to the "Vehicle Speed Sensor Diagnosis" routine. If Fselc 1=0, the "Vehicle Speed Sensor Diagnosis" is judged to be non-selected and the program advances to the next diagnosis. If Fselc 1=1, the "Vehicle Speed Sensor Diagnosis" is judged to be selected and the program advances to step S202.

The step S202 determines whether or not the "Vehicle Speed Sensor Diagnosis" has already been passed on the basised of the value of a pass flag Fpass 1 related to said diagnosis. The flag Fpass XX represents whether the diagnostic item XX has been passed or failed. If Fpass 1=1, the diagnostic item 1 is judged to have been passed and the program advances the next diagnosis item. If Fpass 1=0, the diagnostic item 1 is judged not to have been passed yet and the program advances to step S203.

Step S203 reads the reference vehicle speed VSref stored as one of standard data stored in the standard data storage area 73 (FIG. 5) of the ROM card 7, and step S204 detects a current vehicle speed VS through the ECU 1. Step S205 executes the vehicle speed sensor diagnostic routine based on the reference vehicle speed VSref and the detected vehicle speed VS. Step S206 determines whether or not the diagnosis executed in the step S205 is passed. If passed, step S207 sets the diagnosis pass flag Fpass 1 to "1". If not passed, the program advances to the next diagnosis. Step S208 erases the diagnostic item number "01" from the display 27. FIG. 6(b) shows an exemplary image displayed on the display 27 when only the "Vehicle Speed Sensor Diagnosis" has been passed, where only the diagnostic item number "01" has been erased.

Figure 11:
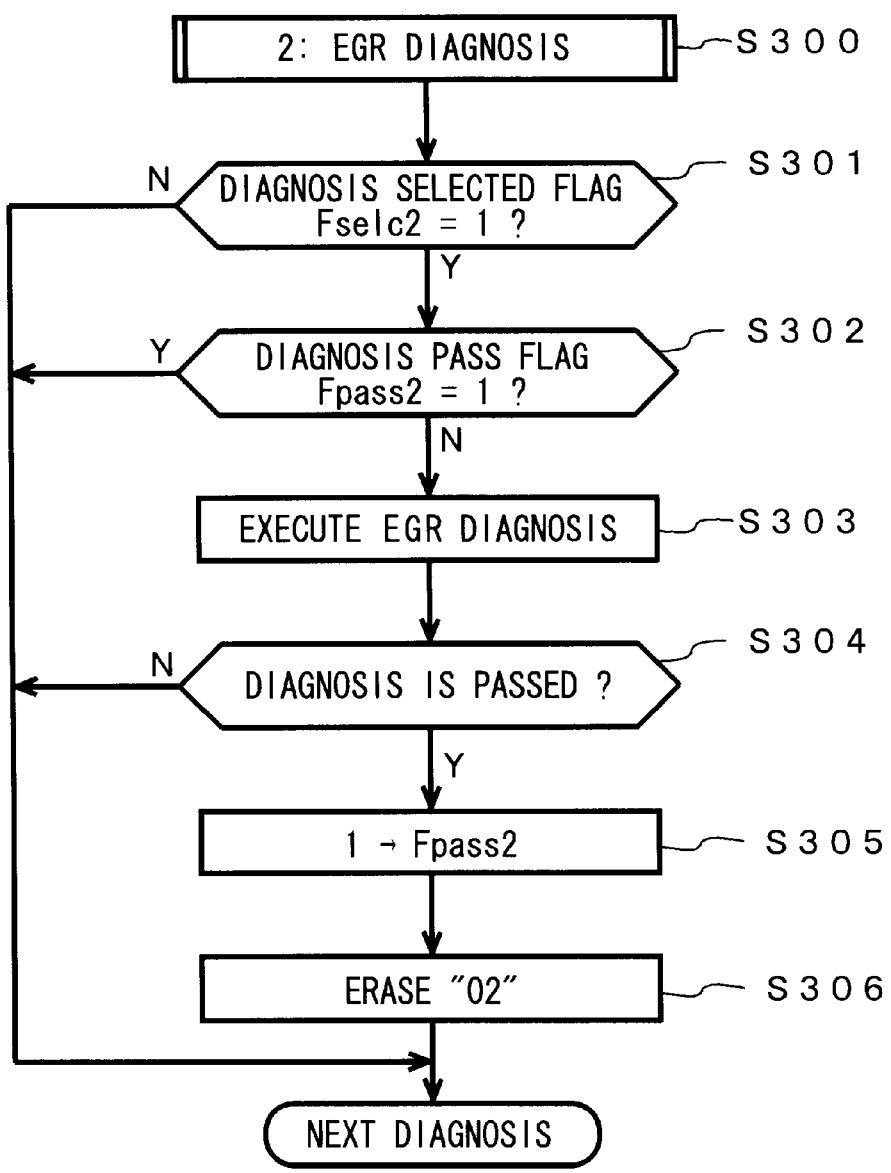
FIG. 11 is a flowchart showing an operation of an EGR diagnosis.

FIG. 11 is a flowchart showing a method of the diagnostic item 2 "EGR Diagnosis" to be executed by the step S300 of FIG. 8. The "EGR Diagnosis" routine is to decide whether or not a device (EGR) to reduce NOx by recirculating exhaust gas into a combustion chamber of the engine normally function.

As similar to the diagnostic item 1, steps S301 and S302 determine whether or not the diagnostic item 2 has been selected and the diagnosis has been passed based on the values of the diagnostic selection flag Fselc 2 and the diagnostic pass flag Fpass 2 related to the "EGR Diagnosis". If the "EGR Diagnosis" is selected (Fselc 2=1) but not yet be passed (Fpass 2=0), step S303 executes the "EGR Diagnosis" routine in a proper manner. If step S304 judges the diagnosis to be passed, step S305 sets the diagnostic pass flag Fpass 2 to "1", and step S306 erases the diagnostic item number "02" from the display 27. On the other hand, if not be passed yet, the program advances from the step S304 to the next diagnosis item.

Figure 12:
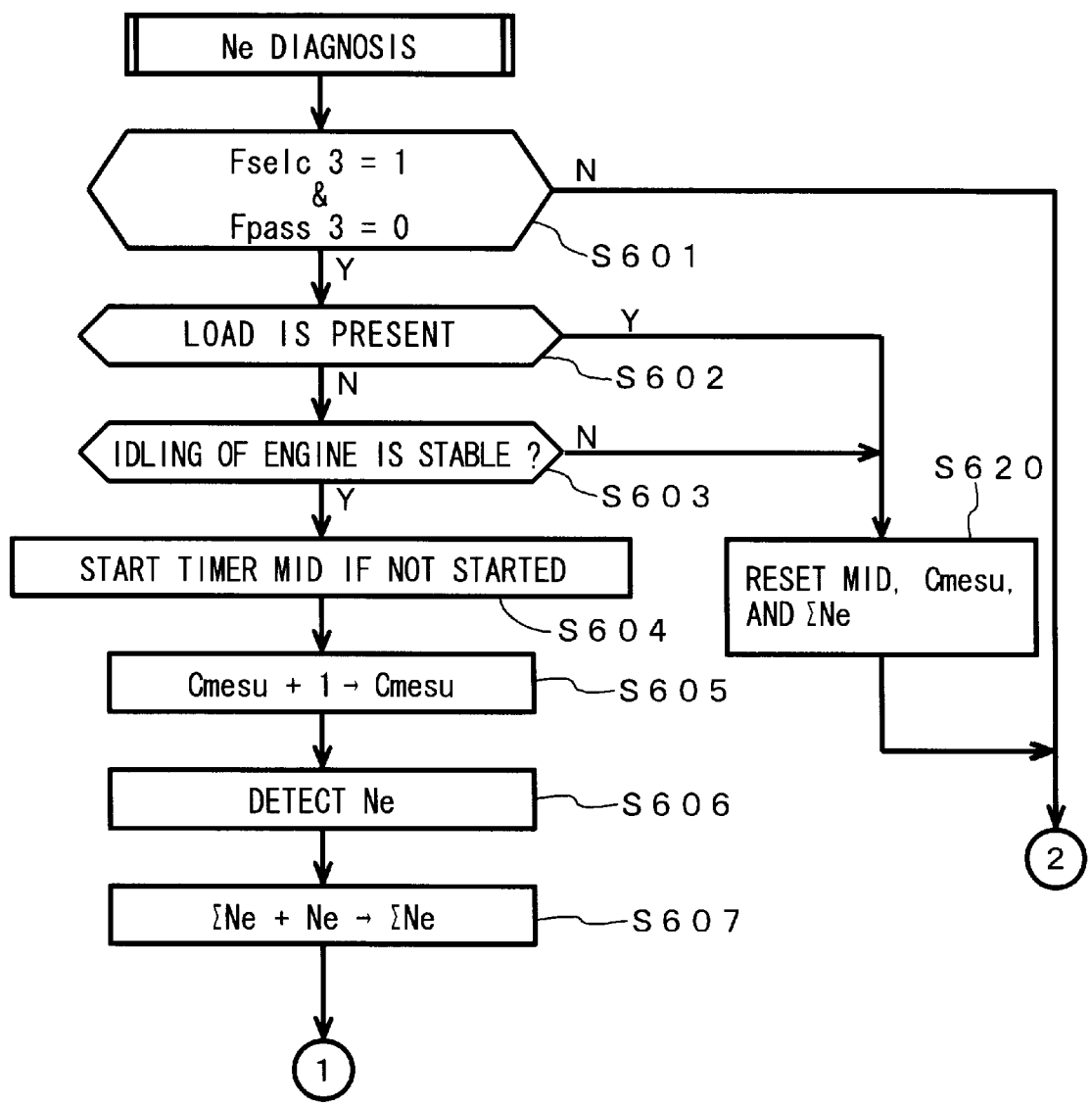
FIGS. 12 and 13 show a flowchart of an Ne diagnosis when combined each other.
Figure 13:
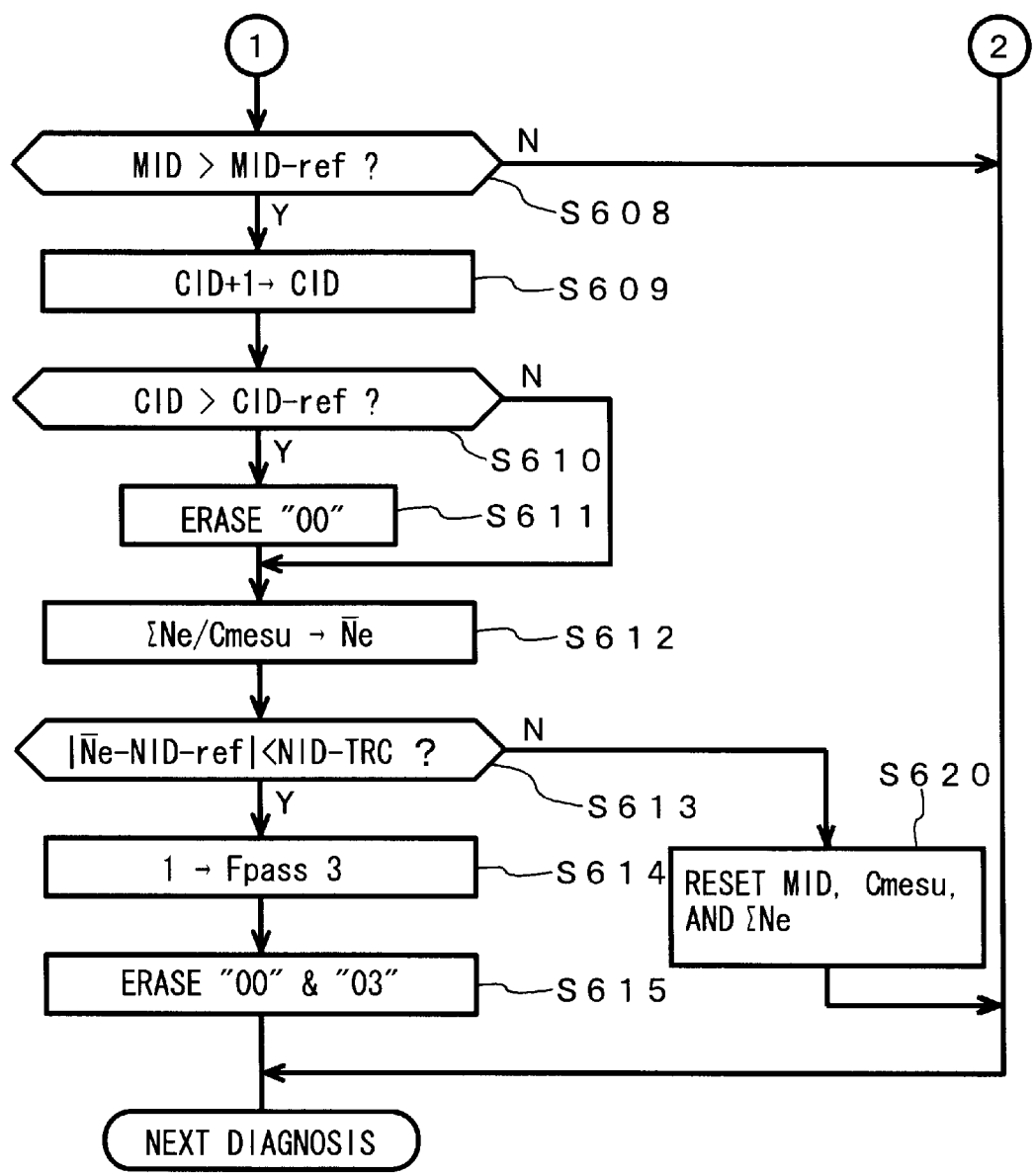

FIGS. 12 and 13 are flowcharts showing a method of the diagnostic item 3 "Ne Diagnosis" executed by the step S600 of FIG. 8. The "Ne Diagnosis" routine is to diagnose whether the engine speed at idling time is normal or abnormal, in which the engine speed Ne during the idling time is compared with a reference value (having the tolerance NID-TRC) to diagnose of the engine speed Ne in accordance with the comparison result.

As similar to the above-mentioned diagnostic items, step S601 determines whether or not the diagnostic item 3 has been selected and the diagnosis has been passed based on the values of the diagnostic selection flag Fselc 3 and the diagnostic pass flag Fpass 3 related to the diagnostic item 3. If the "Ne Diagnosis" has been selected (Fselc 3=1) but not yet be passed (Fpass 3=0), the program advances to step S602. Otherwise, the program advances to the next diagnosis.

The step S602 determines whether or not the engine is loaded. The engine is loaded when any of the electrical equipments are turned on or a power steering is operated. "Ne Diagnosis" is judged to be passed when a difference between the detected idling speed Ne and a target value is smaller than a predetermined reference value. However, the application of the load having the effect on the engine speed, such as an engine load or a electrical load, requires engine control so as to overcome the load, where the idling speed is set higher than usual, and this makes it difficult to diagnose the idling speed accurately. Therefore, the present embodiment has step S602 to determine whether the load is present or absent prior to the "Ne Diagnosis". If the load is detected, the program advances to step S620 without execution of the Ne diagnosis, in which variables such as in a timer MID, a number of times of accumulating Cmesu, and an accumulated value ΣNe, which are described later, are reset. After that, the program advances to the next diagnosis item. On the other hand, if the load is not detected, the program advances to step S603, in which it is determined whether or not the idling of engine is stable. If not stable, the program advances to step S620, and if stable, it advances to step S604.

When the idling of engine is stable and the diagnosis starting conditions are satisfied, the step S604 judges an operating state of the timer MID. If the timer MID has not been started yet, it will be started. Step S605 increases the number of times of accumulating Cmesu by 1 (one). Step S606 receives the value of a current engine speed Ne from the ECU 1 and step S607 adds the detected engine speed Ne to the last accumulated value ΣNe. The resultant value is then registered as a new accumulated value ΣNe.

In the subsequent step S608 of FIG. 13, the timer MID is compared with a reference idling measurement time MID-ref stored as a data piece of the standard data. If the value of the counter MID reaches the MID-ref, the measurement time required for the "Ne Diagnosis" is regarded as having already been elapsed and the program advances to step S609, in which the number of times of idling diagnoses CID is increased by 1 each time the idling diagnosis is executed. Then, step S610 compares the number of times of idling diagnoses CID with a predetermined reference number of times of idling diagnoses CID-ref stored as a data piece of the standard data.

If the number of times of idling diagnoses CID reaches the reference number of times of idling diagnoses CID-ref, the number of measurement times is regarded as being enough for the diagnosis. Therefore, step S611 erases the number "00" from the display 27. The subsequent step S612 divides the accumulated value ΣNe of the engine speed Ne by the number of times of accumulating Cmesu to calculate the average value of the engine speed Ne.

In step S613, an absolute value of a difference between the average value of the engine speed Ne and the unique data NID-ref is compared with the idling tolerance NID-TRC stored as a data piece of the standard data. If the absolute value is equal to, or smaller than the idling tolerance NID-TRC, the idling of engine is diagnosed as being normal and the program advances to step S614. On the other hand, if the absolute value exceeds the idling tolerance NID-TRC, the idling of engine can not be diagnosed as being not normal at this stage and the program advances to step S620. In the step S620, variables such as the timer MID, the number of times of accumulating Cmesu, and the accumulated value $\Sigma Ne$ are reset, and the program advances to the next diagnosis. The step S614 sets "1" as the diagnostic pass flag Fpass 3 related to the "Ne diagnosis", and the subsequent step S615 erases the diagnostic item number "03" (and the number "00" if it remains) from the display 27.

As previously described, the present embodiment accumulates the engine speed Ne detected as the "Ne diagnosis" routine is repeatedly executed, to calculate the average value of the engine speed based on the accumulated value $\Sigma Ne$. Since the engine speed Ne is diagnosed based on whether or not the average value of the detected Ne's is within the reference range, the "Ne diagnosis" can be executed efficiently even using a diagnostic method of repeatedly circulating plural types of diagnoses for a very short period of each execution cycle.

Figure 14:
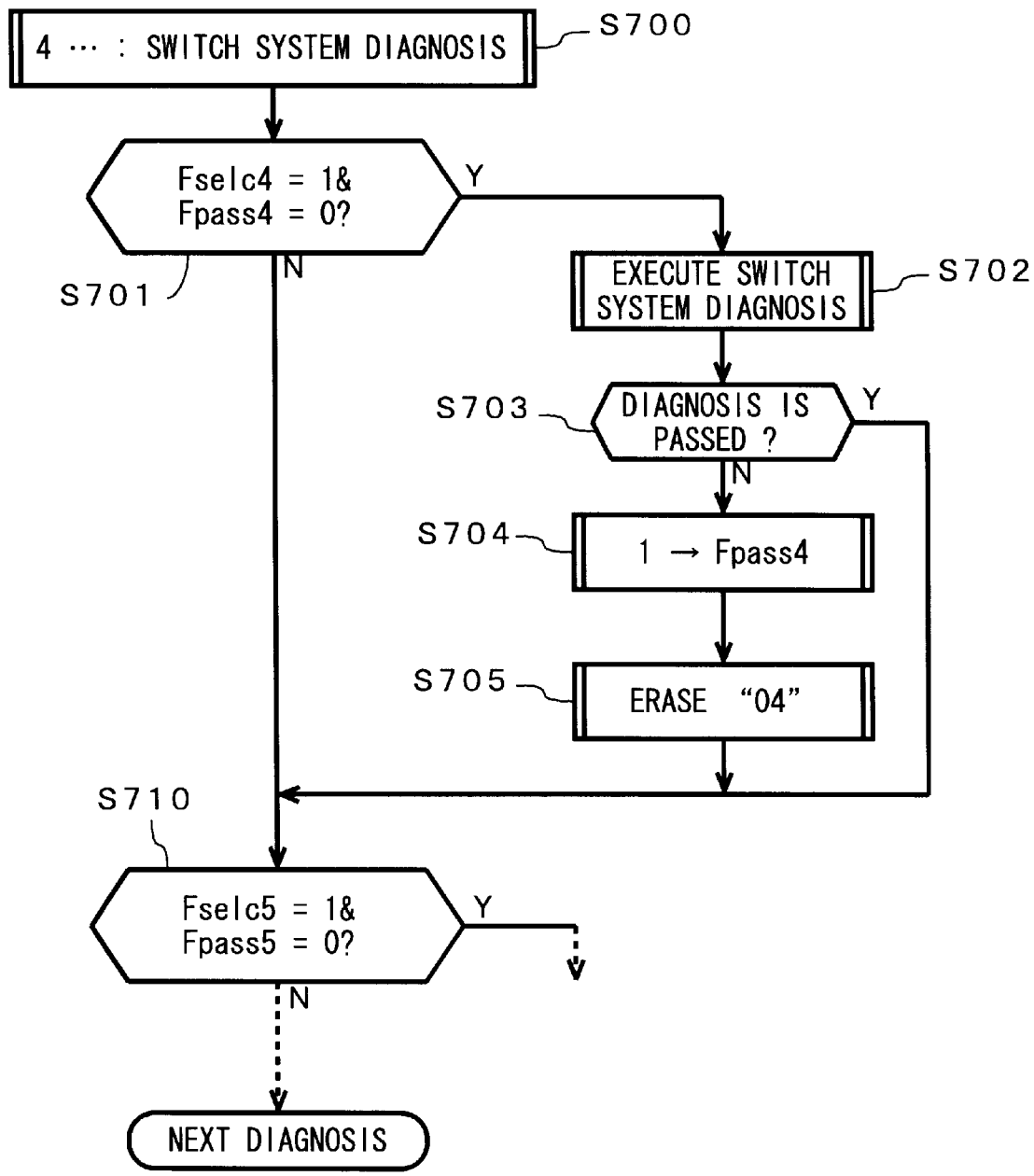
FIG. 14 is a flowchart showing an operation of each switch system diagnosis.

FIG. 14 is a flowchart showing a method of diagnosing each switch in a switch system, which is related to the diagnostic items 4, 5, . . . to be executed by the step S700 of FIG. 8. In the "Switch system diagnosis", each switch is diagnosed as being passed when both of on-and off-states of the switch to be diagnosed are detected.

As similar to the above cases, step S701 determines whether or not the diagnostic item 4 has been selected and the diagnosis has been passed based on the values of the diagnostic selection flag Fselc 4 and the diagnostic pass flag Fpass 4 related to a "Brake Switch Diagnosis". If the "Brake Switch Diagnosis" is selected (Fselc 4=1) but not yet be passed (Fpass 4=0), the program advances to step S702. Otherwise, the program advances to step S710, in which the next switch diagnosis (diagnostic item 5) is executed. The step S702 diagnoses on- and off-states of the brake switch. Step S703 determines whether the diagnosis is passed or failed. If both of the on- and off- states has passed, step S704 sets the diagnostic pass flag Fpass 4 to "1" and step S705 erases the diagnostic item number "04" from the display 27. Similarly, other switches are diagnosed in the same manner as above mentioned, and respective numbers of the passed diagnostic items are erased from the display 27 in due order.

Figure 15:
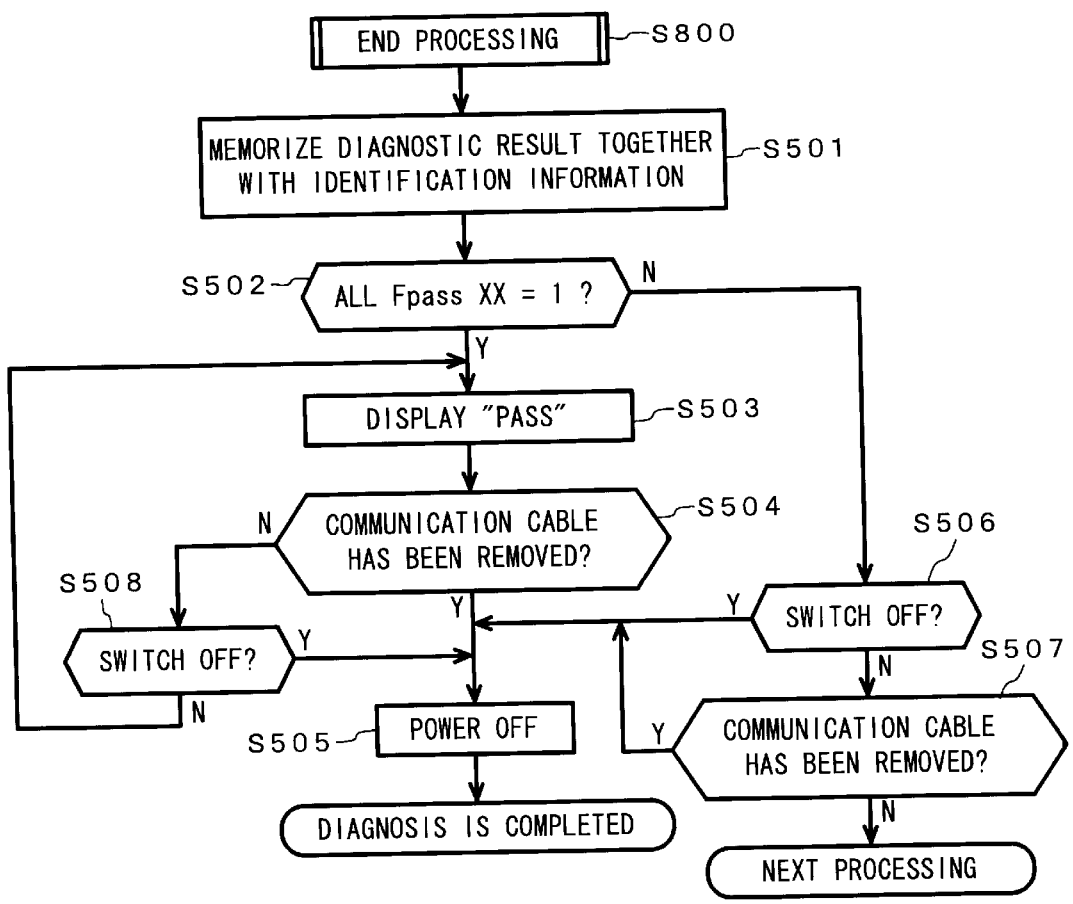
FIG. 15 is a flowchart showing an operation of an end processing.

FIG. 15 is a flowchart showing the "End Processing" (step S800) of FIG. 8. In the first step S501, the current diagnostic results, such as the number of the diagnostic item that each diagnosis has not been passed yet, are stored into the RAM 22 in correspondence with each individual identification code of the vehicle read in the step S114 of FIG. 9. The diagnostic results are rewritten or replaced by a new diagnostic results each time the step S501 is executed.

The RAM 22 shown in FIG. 1 is able to store the diagnostic results of plural vehicles in correspondence with respective identification codes. When the diagnostic results of plural vehicles, e.g., 50 or 60 vehicles, are stored, they are put into a single data set and transferred by radio through the transmitter 24 to the host machine, such as the host computer 30, automatically or by the operator manually selecting a "Transfer" from the menu on the display screen. In the host computer 30, a plurality of data sets, each representing the diagnostic results transferred in the plural data sets, are then incorporated into one unit and stored into the storage device 33. When storing data of predetermined units, e.g., for several hundreds vehicles, the data is memorized into a removable, portable storage medium such as an IC card or a floppy disk.

Such a batch processing in managing the diagnostic results of each individual vehicle makes it possible not only to improve the work efficiency of the operator, but also to simplify the process of taking statistics of the diagnostic results. It is therefore possible to analyze the diagnostic results and feed back the analysis result to the production process immediately.

The step S502 of FIG. 15 refers to all the diagnostic pass flags Fpass XX to determine whether all the diagnostic items are passed or not. In the case where all the diagnostic pass flags Fpass XX are set to "1", step S503 makes the display indicate a word "Pass", as shown in FIG. 6(f), to inform the operator that all the diagnoses are completed. Step S504 determines whether or not the communication cable 5 has been removed from the ECU 1, and if removed, the vehicle diagnostic apparatus 2 is turned off in step S505. On the other hand, if not removed, step S508 determines whether or not the power has been inactivated by the operator's turning off the power-off key switch. After the key operation by the operator, the program advances to step S505. Otherwise, the program returns to the step S503.

In the case where at least one of the diagnostic items, e.g., the diagnostic item 2, is not judged to be passed in the step S502, the program advances to step S506. In this case, since the number "02" remains on the display 27, as shown in FIG. 6(c), the operator can easily recognize that only the diagnostic item 2 has not been passed yet.

When the diagnostic item number "03" related to the "Ne Diagnosis" remains on the display 27, as shown in FIGS. 6(d) and 6(e), the validity of the fail result in the diagnostic item 3 are judged based on whether or not the number "00" remains on the display 27. As previously described by referring to the steps S610 and S611 of FIG. 13, the indication of "00" is erased when the diagnosis starting conditions for the diagnostic item 3, such as the conditions that the engine is warmed up adequately without any load, are satisfied, and the number of times the Ne diagnosis is executed (CID) exceeds a given number (CID>CID-ref). If the indication of "00" remains, as shown in FIG. 6(d), therefore, the operator do not immediately judge the diagnostic item 3 to be bad or failed, but execute the Ne diagnosis. If the numbers "00" and "03" are erased after that the diagnostic item 3 is judged to be passed.

In the case where the number "00" has already been erased, as shown in FIG. 6(e), the operator immediately judges the diagnostic item 3 to be failed because the diagnostic item 3 has not been passed yet in spite of the situation that the preconditions are satisfied and the number of times of diagnoses (CID) reaches an adequate value.

As described above, with the diagnostic item requiring certain preconditions to be satisfied before starting the diagnosis, the vehicle diagnostic apparatus 2 in the present embodiment displays a fail number (an unsatisfied precondition sign) "00" indicated when the preconditions are not satisfied. In the case where such a fail number "00" appears on the display, therefore, the operator can easily recognize that the fail result of the diagnostic item is caused by unsatisfied preconditions even when the diagnostic item has not been passed yet, thus eliminating an error of fail judgment on a diagnostic item that may be passed.

The step S506 determines whether or not the operator has turned off the power switch. If the power switch has been turned off, the program advances to step S505 to turn off the diagnostic apparatus 2. If the power switch has not been turned off, step S507 determines whether or not the communication cable 5 has been removed from the ECU 1. If removed, the program advances to the step S505, in which the vehicle diagnostic apparatus 2 is turned off. If not removed, the program advances to the next process to continue this vehicle diagnostic program.

Figure 16:
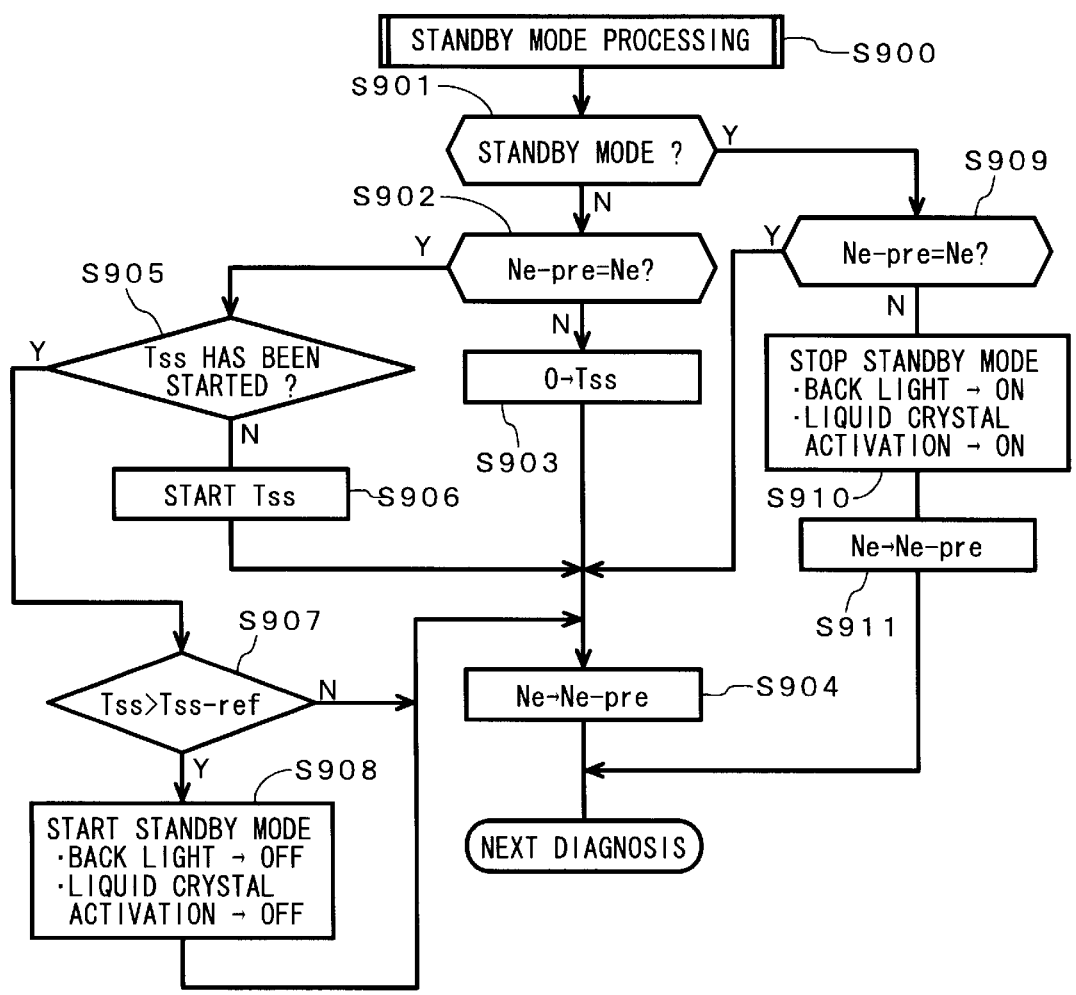
FIG. 16 is a flowchart showing an operation of a standby mode processing.
Figure 18:
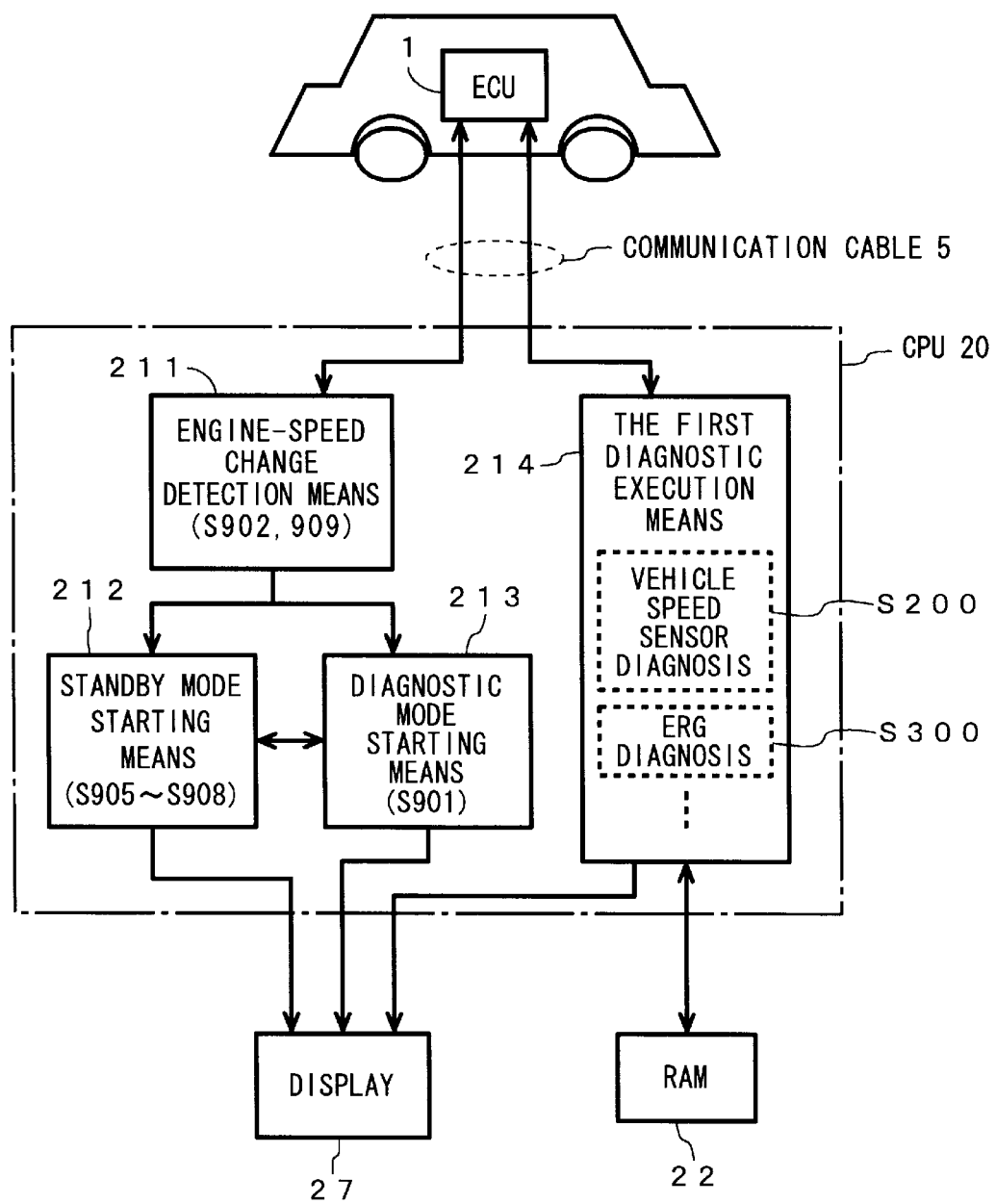
FIG. 18 is a functional block diagram showing a "Standby Mode Processing" according to the present invention.

FIG. 16 is a flowchart showing an operation of a "Standby Mode Processing" to be executed by the step S900 of FIG. 8; FIG. 18 is a functional block diagram of a part of vehicle diagnostic apparatus related to the "Standby Mode Processing". Description will be made first to the structure of the vehicle diagnostic apparatus of the present invention referring to the functional block diagram of FIG. 18, then to a concrete example of the operation referring to the flowchart of FIG. 16. Step numbers in respective blocks of FIG. 18 corresponds to step numbers in respective steps of the flowchart, indicating that the respective blocks execute processings in the corresponding steps.

In FIG. 18, engine-speed change detection means 211 executes processings such as in steps S902 and S909 for communicating with the ECU1 to detect changes in engine speed Ne. Standby mode starting means 212 executes a sequence of steps such as from step S905 to step S908 for starting a standby mode when no change in the engine speed Ne has been detected over a given period of time (Tss-ref) in a diagnostic mode. Diagnostic mode starting means 213 executes a processing such as in step S910 for starting the diagnostic mode when a change in the engine speed Ne is detected in the standby mode.

The first diagnostic execution means 214 communicates with the ECU 1 to execute each diagnosis. The diagnostic results are stored in the RAM 22 and output to the display part 27. The display means 27 is on-state in the diagnostic mode. The display means 27 turns to be off-state when the standby mode is started, then turns back to be on-state when the diagnostic mode is started again.

In such a structure, while the diagnostic work is currently executed, i.e., the engine runs, since the engine speed slightly varies even in an idling state, the engine-speed change detection means 211 will detect such slight changes in the engine speed. Consequently, the diagnostic mode starting means 213 is forced to start the diagnostic mode, and diagnostic results determined by the first diagnosis execution means 214 are stored in the RAM 22 and indicated on the display 27.

On the other hand, when the operator stops the engine such as for suspending the diagnostic work during a recess, the engine speed Ne no longer changes, and the engine-speed change detection means 211 detects no change in the engine speed. Consequently, the standby mode starting means 212 is forced to start the standby mode, and the display part 27 turns to be off-state. After that, once a change in the engine speed is detected again, the display part 27 turns to be on-state, and the diagnostic results stored in the RAM 22 appears again on the display 27.

The first step S901 in FIG. 16 determines whether or not the vehicle diagnostic apparatus 2 is in a diagnostic mode. Since it is in the standby mode in the first execution cycle, the program advances to step S902. The step S902 compares the previously-detected engine speed Ne-pre with a currently-detected engine speed Ne. If the diagnostic process is being executed, i.e., if the engine is running, since the engine speed must slightly fluctuate even in an idling state, both data on the engine speed are usually judged to be not equal. After the judgment, the program advances to step S903, in which a standby mode timer Tss is reset. The subsequent step S904 newly registers the currently-detected engine speed Ne as the previous engine speed Ne-pre, and the program advances to the next diagnosis item.

Once the operator has stopped the engine such as for taking a rest, since the previous engine speed Ne-pre and the current engine speed Ne are judged to agree with each other, the program advances to step S905. The step S905 determines whether or not the timer Tss is started counting. Since the timer Tss is not started counting in the first execution cycle, the program advances to step S906, in which the timer Tss is set to start.

After starting the standby timer Tss, since a Yes answer is obtained in the step S905, the program advances from the step S905 to step S907. The step S907 compares the count value of the timer Tss with a standby mode starting condition Tss-ref stored as a data piece of the standard data. If the count value exceeds the starting condition Tss-ref, step S908 switches the operation mode from the diagnostic mode to the standby mode to turn off the back light of the display 27 and inactivate the liquid crystal. Further, a sequence of diagnostic processes that have been done until then are temporarily stored into the RAM 22.

Once starting the standby mode, the program advances from the step S901 to step S909. The step S909 compares the current engine speed Ne with the previous engine speed Ne-pre. During a recess, both data on the engine speed always agree with each other without fail, and a Yes answer is obtained in the step S909, the standby mode is maintained. When the engine is restarted after the recess, since both data on the engine speed are judged to be not equal in the step S909, the program advances to step S910. The step S910 switches the operation mode from the standby mode to the diagnostic mode to turn on the back light of the display 27 and activate the liquid crystal. At the same time, the diagnostic processes that have been done before starting the standby mode are read out from the RAM 22, and the display contents before starting the standby mode are reproduced on the display 27. Then, step S911 newly registers the currently-detected engine speed Ne as the previous engine speed Ne-pre. After that, the program returns to the "Vehicle Speed Sensor Diagnosis" described by referring to FIG. 10. A sequence of the above diagnosis routines are then repeatedly circulated as shown in FIG. 8.

In the present embodiment, switching from the diagnostic mode to the standby mode is automatically done when no change in engine speed is detected, while switching from the standby mode to the diagnostic mode is automatically done when any fluctuation in engine speed is detected. Therefore, the operator has only to stop the engine when stopping the vehicle diagnostic program temporarily for taking a rest, or to restart the engine when restarting the vehicle diagnostic program after the recess, without any other operation required. This allows the operator to be released from an excess load at switching from the diagnostic mode to the standby mode, and vice versa.

In the present embodiment, each individual diagnosis routine must be executed during an interval after the operator starts an operation for each individual diagnosis until completing the operation. To take the "Brake Switch Diagnosis" by way of example, the "Brake Switch Diagnosis" must be executed while the operator is operating a brake pedal to step on the brake. It is therefore desirable to repeatedly circulate all sequence of diagnosis routines at such a speed as at least one cycle of the diagnoses related to every diagnostic items is executed during an interval after the operator starts an operation for an individual diagnosis until completing the operation. As described above, according to such a diagnostic method of the present invention, the operator is never restricted by the sequence and timing of predetermined operations to be performed for each diagnostic item. This makes it possible to widen the degree of freedom in the sequence and timing of the operations, and hence to execute the vehicle diagnosis program efficiently in a shorter time.

FIG. 7 is a functional block diagram of a mechanism used for the above-mentioned vehicle diagnostic method and apparatus of the present invention, by which the operator can be released from the limits on the sequence and timing of operations to be performed by the operator for each diagnostic item.

Vehicle state detection means 223 communicates with the ECU 1 to circularly detect an actual state of each portion of a vehicle. Selection means 222 selects an expected state of said each portion of the vehicle detected from the standard data storage area 73 or unique data storage area 74 of the ROM card 7. Comparison means 224 compares the actual state of each portion of the vehicle, detected circularly, with the expected state thereof selected by the selection means 222, and diagnoses the corresponding diagnostic item as good (passed) when both states exhibit an expected and predetermined relation. Then the comparison means 224 makes the display 27 indicate the diagnostic result.

The actual vehicle state detected by the vehicle state detection means 223 is compared with the expected state selected by the selection means 222. For example, while the operator runs the vehicle on purpose to execute the "Vehicle Sensor Diagnosis", if an actual state (vehicle speed VS) is detected by the vehicle state detection means 223, an expected state of the vehicle speed (reference vehicle speed VSref) will be selected by the selection means 222. Then both states are compared by the comparison means 224. When both states are identified as exhibiting an expected relation (e.g., correspondence), the comparison means 224 makes the display 27 indicate that the diagnostic item 1 is passed. Specifically, the indication of "01" is erased from the display 27.

FIG. 17 is a functional block diagram showing a mechanism used for the above-mentioned vehicle diagnostic method and apparatus of the present invention, by which diagnostic items can be automatically determined in accordance with the type of electronic control unit mounted on each individual vehicle (ECU code).

Model information reading means 201 is one of functions of the CPU 20 for executing the processing in step S109 (FIG. 9), which reads an ECU code (model information) registered in each individual ECU 1. Diagnostic item selection means 202 is another of functions of the CPU 20 for executing processings such as in steps S110 and S111 (FIG. 9), which selects a "combination of diagnostic items", that corresponds to the ECU code read out, from all the diagnostic items in the diagnostic item management table 71. As shown in FIG. 3, if the ECU code is "○△×□", a combination of diagnostic items 1, 2, 5, 6, . . . will be selected.

Unique data selection means 204 is still another of functions of the CPU 20 for reading an idling speed NID-ref individually set for each specific model engine and referred to by step S613 of FIG. 13, which selects unique data out of the unique data stored in the unique data storage area 74 in response to the read ECU code.

The second diagnosis execution means 203 executes a vehicle diagnosis unique to each individual ECU code, based on a diagnostic program stored in the vehicle diagnostic program storage area 72, the "combination of diagnostic items" selected by the diagnostic item selection means 202, the standard data stored in the standard data storage area 73, and the unique data selected by the unique data selection means 204.

Figure 20:
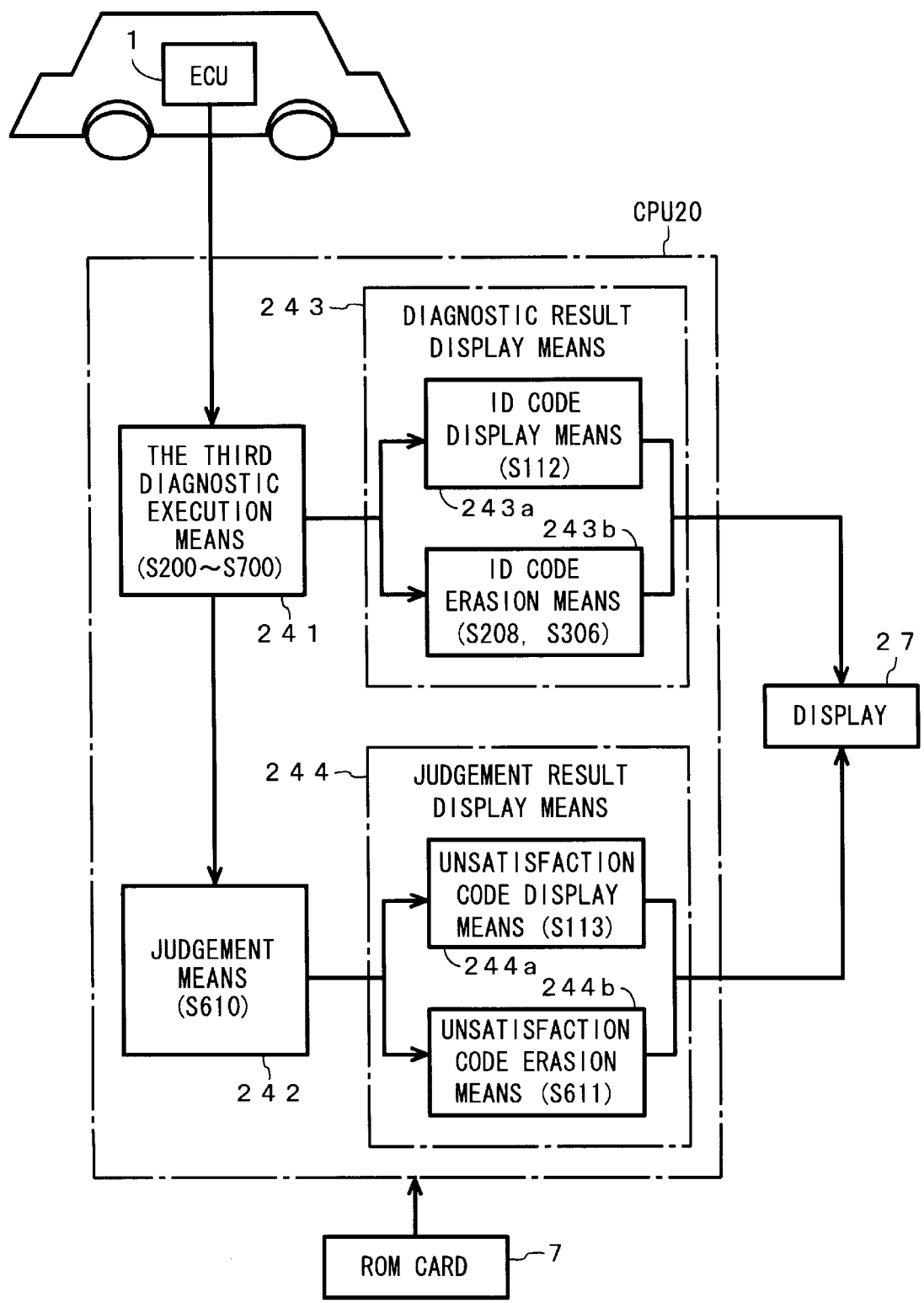
FIG. 20 is a functional block diagram showing a display processing according to the present invention.

FIG. 20 is a functional block diagram showing the above-mentioned vehicle diagnostic method and apparatus of the present invention, in which when a diagnosis requiring a particular precondition is not judged to be passed, determination is made easier as to whether the judgment is caused by a fault in the diagnostic item or the diagnosis itself has not been executed yet due to unsatisfied preconditions.

The third diagnosis execution means 241 is still another of functions of the CPU 20 for circularly execute the vehicle diagnosis related to respective diagnostic items (steps S200 to S700) according to the flowchart of FIG. 8, which automatically diagnoses the respective items, as to whether or not each diagnostic item is passed, according to a predetermined procedure while communicating with the ECU 1. Diagnostic result display means 243 is yet another of functions of the CPU 20, consisting of identification code display means 243a and identification code erasion means 243b, which discriminates between a diagnostic item or items that has not yet been judged to be passed, such as all diagnostic items but a diagnostic item "01" in FIG. 6(b), and a diagnostic item or items that has already been judged to be passed, such as the diagnostic item "01" in FIG. 6(b), and makes the display part 27 indicate such discrimination.

Specifically, the identification code display means 243a executes the processing in step S112 of FIG. 9, by which identification codes (diagnostic item numbers) representative of respective diagnostic items can be listed on the display 27 before starting the diagnosis as shown in FIG. 6(a). On the other hand, the identification code erasion means 243b executes a processing such as in step S208 of FIG. 10 or step S306 of FIG. 11, by which a diagnostic item or items that have already been judged to be passed are erased from the display part 27 as shown in FIG. 6(b).

Judgment means 242 is still another of functions of the CPU 20 for executing a processing such as in step S610 discussed later, which makes a judgment on at least one diagnostic item as to whether or not the preconditions required for the diagnosis have been satisfied. Judgment result display means 244, consisting of unsatisfaction code display means 244a and unsatisfaction code erasion means 244b, displays the judgment results as to whether or not the preconditions have been satisfied.

Specifically, the unsatisfaction code display means 244a executes the processing in step S113 of FIG. 9, which makes the display part 27 show an unsatisfaction code ("00" in the embodiment) for at least one diagnostic item (the diagnostic item 1 related to the "Ne diagnosis" in the embodiment), indicating that the preconditions required for the diagnosis has not been satisfied yet. On the other hand, the unsatisfaction code erasion means 244b executes a processing such as in step S611 of FIG. 13, by which when the preconditions are satisfied (when a YES answer is obtained in the step S610), the unsatisfaction code ("00") is erased from the display part 27.

If such an unsatisfaction code ("00") is displayed, the operator will not judge the diagnostic item to be failed even when the identification code (diagnostic item number) representative of the diagnostic item is displayed after a given period of time has been elapsed. If not displayed, the operator will judge the diagnostic item to be failed. With each of the other diagnostic items that do not require any precondition, the judgment is made to be failed when the identification code is displayed after the given period of time has been elapsed, or to be passed when it is not displayed.

The display part 27 discriminates is display between diagnostic items; the one is not judged to be passed by the diagnostic result display means 243 and the other is judged to be passed by the diagnostic result display means 243. More specifically, the identification code erasion means 243b erases an identification code (diagnostic item number) from the display part 27 only when the diagnostic item represented by the identification code is judged to be passed. The other identification codes that are not judged to be passed remain on the display 27. Thus the operator can easily recognize the diagnostic items that have not been diagnosed to be passed yet.

The judgment result display means 244 makes the display part 27 indicate whether or not a specific item or items (the diagnostic item 1 related to the "Ne diagnosis" in the embodiment) have satisfied the preconditions which are defined to be satisfied before starting the diagnosis. In other words, the display part 27 continues to indicate an unsatisfaction code ("00") for the specific item or items until the preconditions are satisfied. When the identification code representative of the specific item to be diagnosed remains on the display 27 together with the unsatisfaction code ("00"), the operator refers to the contents on the display so that it can be recognized that the diagnosis in the specific item has not been executed yet due to unsatisfied preconditions.

In the present embodiment described above, a list of all the diagnostic item numbers is firstly displayed, diagnostic item numbers judged to be passed are erased from the display in due order, and a diagnostic item number or numbers remaining on the display at the end of execution of the vehicle diagnostic program are judged to be failed. On the contrary, the diagnostic method may be comprised such that the diagnostic items are added onto the display as they are judged to be passed, and a diagnostic item number or numbers that have not appeared on the display at the end of execution of the vehicle diagnostic program are judged to be failed. Similarly, although in the above-mentioned embodiment, the number display "00" is erased when the diagnostic item is executed adequately, it may appear on the display, the contrary, when the diagnostic item 3 is diagnosed adequately. Although the present embodiment also described the vehicle diagnostic method and apparatus for use at a factory, such as in the "inspection process" on the production line, the present invention is not limited by the embodiment and may also be applied to vehicle diagnostic method and apparatus for used under any other environments, such as at an auto repair shop.

INDUSTRIAL APPLICABILITY

As described above, the following advantages are achieved by the present invention.

(1) The operator is not restricted in the sequence and/or timing of predetermined operations to be performed for each diagnostic item. This makes it possible to widen the degree of freedom in the sequence and timing of the operations, and hence to execute the vehicle diagnosis program efficiently at a short time.

(2) The diagnostic contents, i.e., the combination of diagnostic items which may vary according to the individual model information (ECU code), and unique data for a specific model are automatically determined, so that the efficiency of the diagnostic work can be improved.

(3) The diagnostic apparatus according to the present invention automatically switches from the diagnostic mode to the standby mode when no change in the engine speed has been detected over a given period of time, or vice versa when a change in the engine speed is detected. Therefore, the operator has only to stop the engine when suspending the diagnostic process during a recess, or to start again the engine when restarting the diagnostic process, without any other additional operation. This makes it possible to simplify the procedure at switching from the diagnostic mode to the standby mode, and vice versa.

(4) Since the diagnostic process is started immediately without displaying a menu screen when the power is supplied to the diagnosis apparatus by connecting the communication cable, the operator has only to connect the communication cable of the vehicle diagnostic apparatus to each vehicle so that the vehicle diagnosis can be started automatically in the inspection process on the production line, where vehicles to be diagnosed are carried one after another, thus simplifying the operation in the diagnostic process. Otherwise, the menu screen can be displayed when the power is supplied by switch-on of the diagnosis apparatus, and this allows the operator to easily select any function other than the vehicle diagnosis.

(5) A diagnostic item requiring preconditions to be satisfied before starting the diagnosis can be accompanied by an unsatisfaction code on the display for indicating whether or not the diagnosis in the diagnostic item has already been executed after satisfying the preconditions, or whether the precondition has been satisfied or not. Accordingly, even when the diagnostic item is not judged to be passed, the operator can easily recognize that the judgment is caused by unsatisfied preconditions.

We claim:

1. A vehicle diagnostic method using a vehicle diagnostic apparatus connected to an electronic control unit equipped on a vehicle to be diagnosed, in which each diagnostic operation for causing each diagnostic portion corresponding to each of a plurality of diagnostic items to be in an expected state is sequentially executed and diagnosing a diagnostic item as passed when an actual state of a diagnostic portion corresponding to a diagnostic operation is in said expected state, between a start and a stop of said each diagnostic operation, comprising the steps of:

circularly repeatedly diagnosing the plurality of predetermined diagnostic items in a predetermined sequence asynchronously regardless of said each diagnostic operation;

removing the diagnostic item judged to be passed from the diagnostic items;

circularly repeatedly diagnosing at least one remaining diagnostic item that has not been judged as passed; and diagnosing said remaining diagnostic item as failure when said remaining diagnostic item remains not being judged as passed after a predetermined time has elapsed.

2. A method as set forth in claim 1, wherein the diagnosis of every diagnostic items is circulated such that at least one cycle of diagnoses of all the diagnostic items is executed during the interval after the operation is started until it is stopped.

3. A method as set forth in claim 1 or 2, wherein when each portion of the vehicle to be diagnosed has been operated to be the expected state, the actual state of each portion of the vehicle is determined based on at least one of an output signal from a sensor provided in each portion of the vehicle and on-and-off state of a switch.

4. A method as set forth in claim 1 or 2, wherein the diagnostic item or items judged to be passed and the remaining diagnostic item or items are discriminated from each other by displaying both in different ways.

5. A method as set forth in claim 1 or 2, wherein a list of identification codes representative of respective diagnostic items is displayed before starting a sequence of diagnoses, and the diagnostic item or items judged to be passed are erased from the list in due order.

6. A method as set forth in claim 4, wherein an unsatisfaction code is displayed with respect to at least one diagnostic item requiring preconditions when the preconditions have not been satisfied, and erased when the preconditions are satisfied.

7. A method as set forth in claim 1, wherein said vehicle diagnosis is stopped when no change in engine speed has been detected over a given period of time, and restarted when a change in the engine speed is detected.

8. A method as set forth in claim 1, wherein said vehicle diagnostic apparatus is energized when either power-on operation or a connection of said vehicle diagnostic apparatus to said electronic control unit of the vehicle is detected, such that said vehicle diagnosis is immediately executed when said vehicle diagnostic apparatus is connected to said electronic control unit of the vehicle, but executed in accordance with instructions when said vehicle diagnostic apparatus is energized by the power-on operation.

9. A vehicle diagnostic apparatus connected to an electronic control unit equipped on a vehicle to be diagnosed, in which when each portion of the vehicle to be diagnosed is operated to be an expected state, determination is made as to whether a plurality of diagnostic items are passed or failed based on whether or not an actual state of said each portion of the vehicle is in the expected state, the vehicle diagnostic apparatus comprising:

storage means for storing an expected state to be indicated by each portion of the vehicle in response to the operation;

vehicle-state detection means for detecting an actual state of each portion of the vehicle circularly;

comparison means for comparing the actual state detected circularly with the expected state stored in said storage means; and display means for indicating that the diagnostic item corresponding to the actual state detected is judged to be good when both states exhibit an expected relation.

10. An apparatus as set forth in claim 9, wherein the actual state of each portion of the vehicle is detected based on at least one of an output signal from a sensor provided in each portion of the vehicle and on-and-off state of a switch.

11. An apparatus as set forth in claim 9, wherein a list of identification codes representative of respective diagnostic items is displayed before starting a sequence of diagnoses, and the diagnostic item or items judged to be passed are erased from the list in due order.

12. An apparatus as set forth in claim 9, further comprising:

model information reading means for reading model information unique to the electronic control unit mounted on each individual vehicle;

a diagnostic item management table in which a combination of items to be diagnosed is stored for each model information; and diagnostic item selection means for selecting a particular combination of diagnostic items out of said diagnostic item management table in accordance with the read model information, wherein said vehicle-state detection means detects an actual state of each portion of the vehicle in correspondence to each selected diagnostic item circularly.

13. An apparatus as set forth in claim 9, further comprising:

engine-speed change detection means for detecting changes in engine speed;

standby mode starting means for starting a standby mode to stop the vehicle diagnosis when no change in the engine speed has not been detected over a given period of time in a diagnostic mode; and diagnostic mode starting means for starting the diagnostic mode to restart the vehicle diagnosis when a change in the engine speed is detected in the standby mode.

14. An apparatus as set forth in claim 9, further comprising:

power-on operation detection means for detecting power-on operation;

connection detection means for detecting a connection of said vehicle diagnostic apparatus to said electronic control unit mounted on the vehicle;

main control means which is started when either the power-on operation or the connection of said vehicle diagnostic apparatus to said electronic control unit mounted on the vehicle is detected;

menu-screen display means for displaying a menu screen when said main control means is started by the power-on operation;

selected processing starting means for starting a processing selected on the menu screen; and vehicle diagnosis starting means for immediately starting execution of the vehicle diagnosis without displaying the menu screen when said main control means is started by connecting said vehicle diagnostic apparatus to said electronic control unit mounted on the vehicle.

15. An apparatus as set forth in claim 9, further comprising precondition judgment means for judging whether or not at least one diagnostic item requiring precondition has satisfied the preconditions and making said display means indicate the judgment results when the precondition is satisfied.

* * * * *